(12) United States Patent
Ali et al.

(10) Patent No.: US 11,873,452 B1
(45) Date of Patent: Jan. 16, 2024

(54) METHODS FOR PROCESSING HYDROCARBONS TO PRODUCE LIGHT OLEFINS USING CATALYST FORMULATIONS OR MIXTURES

(71) Applicants: Saudi Arabian Oil Company, Dhahran (SA); King Abdullah University of Science and Technology, Thuwal (SA)

(72) Inventors: Ola S. Ali, Dhahran (SA); Khalid Ali Almajnouni, Dhahran (SA); Jorge Gascon Sabate, Thuwal (SA); Tuiana Bairovna Shoinkhorova, Thuwal (SA); Alberto Rodriguez Gomez, Thuwal (SA); Alla Dikhtiarenko, Thuwal (SA)

(73) Assignees: SAUDI ARABIAN OIL COMPANY, Dhahran (SA); King Abdullah University Of Science And Technology, Thuwal (SA)

( * ) Notice: Subject to any disclaimer, the term of this patent is extended or adjusted under 35 U.S.C. 154(b) by 0 days.

(21) Appl. No.: 18/064,402

(22) Filed: Dec. 12, 2022

(51) Int. Cl.
    *C10G 11/18* (2006.01)
(52) U.S. Cl.
    CPC ........ *C10G 11/182* (2013.01); *C10G 2400/20* (2013.01); *C10G 2400/30* (2013.01)
(58) Field of Classification Search
    CPC .............. C10G 11/182; C10G 2400/20; C10G 2400/30
    See application file for complete search history.

(56) References Cited

U.S. PATENT DOCUMENTS

| 2,685,498 A | 8/1954 | Dickinson |
| 2,929,774 A | 3/1960 | Smith |

(Continued)

FOREIGN PATENT DOCUMENTS

| EP | 2301658 A1 | 3/2011 |
| WO | 2018169768 A1 | 9/2018 |
| WO | 2021019445 A1 | 2/2021 |

OTHER PUBLICATIONS

Alabdullah et al. "Composition-performance Relationships in Catalysts Formulation for the Direct Conversion of Crude Oil to Chemicals." ChemCatChem 13.7 (2021): 1806-1813.

(Continued)

*Primary Examiner* — Randy Boyer
*Assistant Examiner* — Juan C Valencia
(74) *Attorney, Agent, or Firm* — Leason Ellis LLP

(57) ABSTRACT

Light olefins may be produced from hydrocarbons by a method including passing a hydrocarbon feed stream into one or more feed inlets of a reactor, using catalyst formulations or mixtures. Catalyst formulations may include multi-zeolite composite particles, or a mixture that is a physically mixed combination of separate particles of at least first composite particles of a first type of zeolite and second composite particles of a second type of zeolite. The reactor may include an upper reactor portion defining an upper reaction zone and a lower reactor portion defining a lower reaction zone. The catalyst may move in a generally downward direction through the upper reactor portion and the lower reactor portion, and the hydrocarbon feed stream may move in a generally upward direction through the lower reactor portion and upper reactor portion such that the hydrocarbon feed stream and the catalyst move with a counter-current orientation.

24 Claims, 8 Drawing Sheets

(56) References Cited

U.S. PATENT DOCUMENTS

| | | | |
|---|---|---|---|
| 3,082,165 A | 3/1963 | Hugo et al. | |
| 3,650,946 A | 3/1972 | Mourning | |
| 3,799,868 A | 3/1974 | Gantt | |
| 3,837,822 A * | 9/1974 | Ward | B01J 8/125 48/197 R |
| 3,879,281 A | 4/1975 | Jones | |
| 4,259,175 A | 3/1981 | McArthur | |
| 4,356,082 A | 10/1982 | Gross | |
| 4,820,493 A | 4/1989 | Haddad et al. | |
| 4,869,807 A | 9/1989 | Krishna | |
| 5,062,944 A | 11/1991 | Leib et al. | |
| 5,451,313 A | 9/1995 | Wegerer et al. | |
| 5,468,369 A | 11/1995 | Muldowney | |
| 5,616,237 A | 4/1997 | Krishna et al. | |
| 6,656,346 B2 | 12/2003 | Ino et al. | |
| 7,077,949 B2 | 7/2006 | Bakker et al. | |
| 7,275,048 B2 | 9/2007 | Bigus et al. | |
| 7,594,994 B1 | 9/2009 | Seibert et al. | |
| 8,349,170 B2 | 1/2013 | Tammera et al. | |
| 9,388,095 B2 | 7/2016 | Leroy et al. | |
| 9,452,404 B2 | 9/2016 | Marri et al. | |
| 9,458,394 B2 | 10/2016 | Pean et al. | |
| 11,446,625 B2 | 9/2022 | Gascon et al. | |
| 2004/0024276 A1 | 2/2004 | Smith et al. | |
| 2004/0104148 A1 | 6/2004 | Lomas et al. | |
| 2008/0035526 A1 | 2/2008 | Hedrick et al. | |
| 2013/0338418 A1 | 12/2013 | Xu et al. | |
| 2014/0014555 A1 | 1/2014 | Marri et al. | |
| 2016/0160134 A1 | 6/2016 | Voolapalli et al. | |
| 2017/0087528 A1 | 3/2017 | Pretz et al. | |
| 2021/0317373 A1 | 10/2021 | Gong et al. | |
| 2022/0033714 A1 | 2/2022 | Al-Majnouni et al. | |

OTHER PUBLICATIONS

Blay et al. "Engineering zeolites for catalytic cracking to light olefins." ACS Catalysis 7.10 (2017): 6542-6566.

Jakobsen. "Chapter 6: Chemical Reaction Engineering." Chemical Reactor Modeling. 2nd Edition, 2014. Springer, Cham. https://doi.org/10.1007/978-3-319-05092-8_6. pp. 789-790.

Jakobsen. "Chapter 10: Fluidized Bed Reactors." Chemical Reactor Modeling. 2nd Edition, 2014. Springer, Cham. https://doi.org/10.1007/978-3-319-05092-8_10. pp. 1005-1017.

* cited by examiner

METHODS FOR PROCESSING HYDROCARBONS TO PRODUCE LIGHT OLEFINS USING CATALYST FORMULATIONS OR MIXTURES

TECHNICAL FIELD

Embodiments of the present disclosure generally relate to methods for processing hydrocarbons, and more specifically, to methods for processing hydrocarbons to produce olefins using catalyst formulations or mixtures.

DESCRIPTION OF RELATED ART

Light olefins, including ethylene, propylene, and butene, are basic intermediates used by a large portion of the petrochemical industry. In particular, pure streams of light olefins may be used during the production of various polymers and chemicals. Traditionally, light olefins may be produced by thermal cracking of petroleum fractions such as naphtha, kerosene, or gas oil. Light olefins could also be produced by fluid catalytic cracking (FCC) processes. As the demand for light olefins increases, there is a need for improved methods to produce light olefins.

It is in regard to these and other problems in the art that the present disclosure is directed to provide a technical solution for improved methods to produce light olefins using catalyst formulations or mixtures.

SUMMARY OF THE DISCLOSURE

Light olefins may be produced from hydrocarbons by a method including passing a hydrocarbon feed stream into one or more feed inlets of a reactor, using catalyst formulations or mixtures. Catalyst formulations may include multi-zeolite composite particles, or a mixture that is a physically mixed combination of separate particles of at least first composite particles of a first type of zeolite and second composite particles of a second type of zeolite. The reactor may include an upper reactor portion defining an upper reaction zone and a lower reactor portion defining a lower reaction zone. The catalyst may move in a generally downward direction through the upper reactor portion and the lower reactor portion, and the hydrocarbon feed stream may move in a generally upward direction through the lower reactor portion and upper reactor portion such that the hydrocarbon feed stream and the catalyst move with a counter-current orientation. Contacting the catalyst with the hydrocarbon feed stream may crack one or more components of the hydrocarbon feed stream and form a hydrocarbon product stream. The method may further include passing the hydrocarbon product stream out of the upper reaction zone through the hydrocarbon product outlet.

In certain embodiments, the catalyst particles comprise a mixture that is a physically mixed combination of separate particles of at least first composite particles and second composite particles. The first composite particles comprise about 5-70 wt. % of a 10-member ring zeolite component optionally modified with phosphorous, about 5-70 wt. % of a first binder component, about 10-60 wt. % of a first filler component; and 0-40 wt. % of an optional first additive component. The second composite particles comprise about 5-wt. % of a 12-member ring zeolite component, about 5-70 wt. % of a second binder component, about 10-60 wt. % of a second filler component; and about 0-40 wt. % of an optional second additive component. The first and second binder component are the same or different amorphous components selected from the group consisting of alumina (including γ alumina), silica, silica-aluminate, alumina phosphate and combinations comprising two or more of said amorphous binder components. The first and second optional filler component are the same or different components selected from the group consisting of kaolin, sepiolite, talc, attapulgite, montmorillonite and two or more of said filler components. The first and second additive component are the same or different components selected from the group consisting of metal carbides (including silicon carbide), rare earth metals (including cerium and lanthanum), alkali metals (including sodium), alkaline earth metals, and metal oxides (including ferric oxide and cupric oxide).

In certain embodiments, the catalyst particles comprise multi-zeolite composite particles. The multi-zeolite composite particles comprise: about 5-75 wt. % of a 10-member ring zeolite component modified with phosphorous, about 5-75 wt. % of a 12-member ring zeolite component, about 5-70 wt. % of a binder component, about 10-60 wt. % of a finer component; and about 0-40 wt. % of an optional additive component. The binder component is an amorphous component selected from the group consisting of alumina (including γ alumina), silica, alumina-silicate, silica-aluminate, alumina phosphate and combinations comprising two or more of said amorphous binder components. The filler component is selected from the group consisting of kaolin, sepiolite, talc, attapulgite, montmorillonite and two or more of said filler components. The additive component is selected from the group consisting of metal carbides (including silicon carbide), rare earth metals (including cerium and lanthanum), alkali metals (including sodium), alkaline earth metals, and metal oxides (including ferric oxide and cupric oxide).

Any combinations of the various embodiments and implementations disclosed herein can be used. These and other aspects and features can be appreciated from the following description of certain embodiments and the accompanying drawings and claims.

BRIEF DESCRIPTION OF DRAWINGS

The following detailed description of specific embodiments of the present disclosure can be best understood when read in conjunction with the following drawings, where like structure is indicated with like reference numerals.

DETAILED DESCRIPTION

Figure 1:
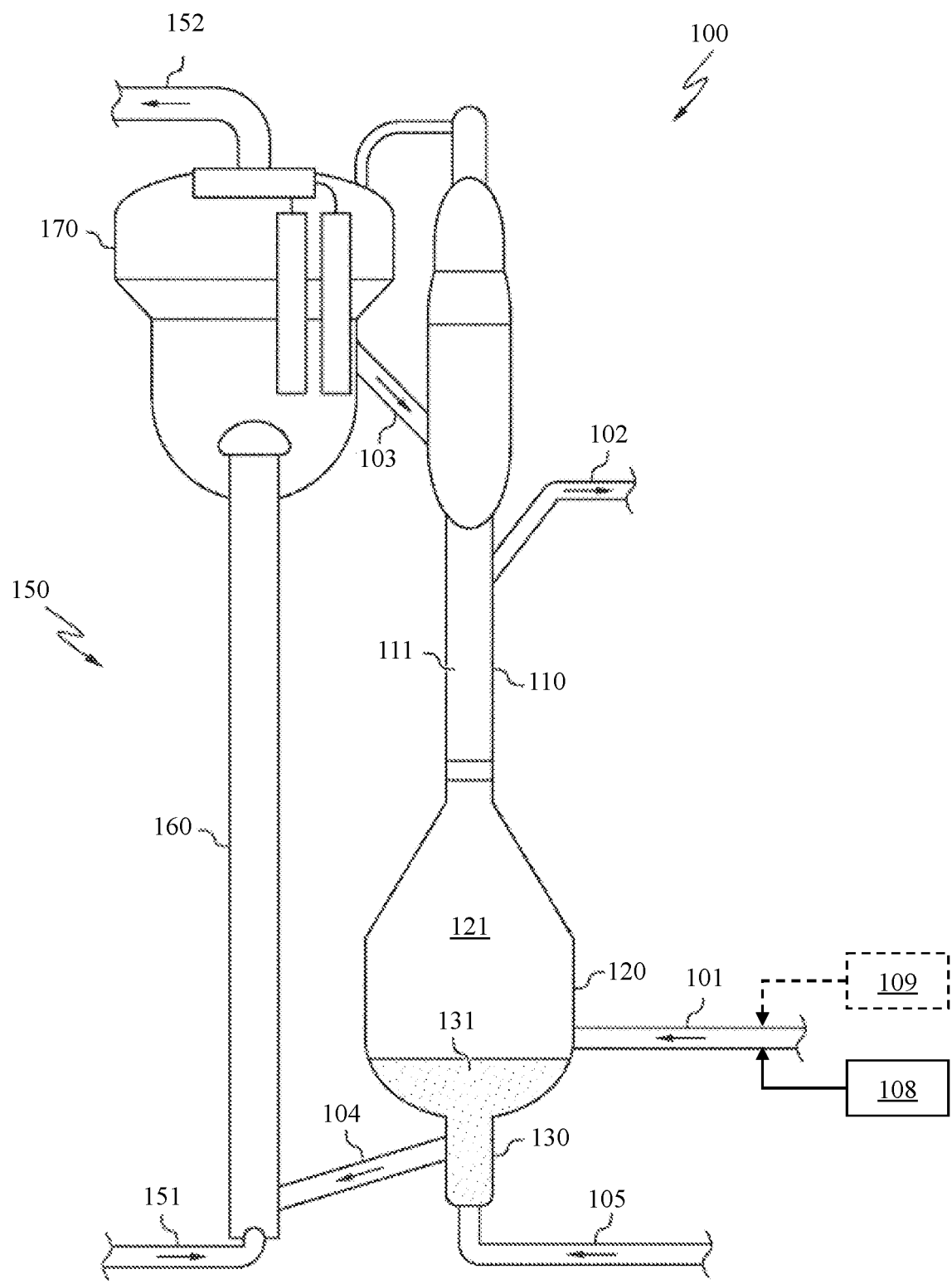
FIG. 1 schematically depicts a reactor and catalyst regenerator for producing light olefins according to one or more embodiments disclosed herein.

Embodiments of the present disclosure are directed to systems and processes for processing hydrocarbons to produce light olefins using catalyst formulations or mixtures. The present disclosure includes embodiments related to the methods and apparatuses described in commonly owned U.S. patent application Ser. No. 16/940,668 filed Jul. 28, 2020, entitled "Methods and apparatuses for processing hydrocarbons to produce light olefins" and published as US20220033714A1, which is incorporated by reference herein in its entirety.

As used in this disclosure, a "reactor" refers to a vessel in which one or more chemical reactions may occur between one or more reactants in the presence of one or more catalysts. One or more "reaction zones" may be disposed in a reactor. As used in this disclosure, a "reaction zone" refers to an area where a particular reaction takes place in a reactor. In certain embodiments, a reaction zone comprises an area that is arranged as a counter-current plug flow reactor. In certain embodiments, a reactor comprises a reaction zone comprises an area that is arranged as a dense bed fluidized reactor. In certain embodiments, a reactor comprises one reaction zone that is an area arranged as a counter-current plug flow reactor, and another reaction zone that is a separate area is arranged as a dense bed fluidized reactor. In certain embodiments, a reactor comprises a stripping zone to strip hydrocarbons adsorbed on the catalyst.

As used in this disclosure, "hydrocarbon reactants" refer to hydrocarbons from a hydrocarbon feed stream that are passing through the reactor, and may include one or more initial hydrocarbon feed streams, one or more recycle streams, and one or more co-feeds containing hydrocarbons. In certain embodiments "hydrocarbon reactants" refer to hydrocarbons from a primary or initial hydrocarbon feed stream that are passing through the reactor, and may include one or more co-feeds, including steam and/or oxygenates. In certain embodiments "hydrocarbon reactants" refer to hydrocarbons from a primary hydrocarbon feed stream that are passing through the reactor, and may include one or more recycle feeds, such as at least a portion of cycle oil (light, heavy or a combined cycle oil stream) from reactor effluents. In certain embodiments "hydrocarbon reactants" refer to hydrocarbons from a primary hydrocarbon feed stream that are passing through the reactor, and may include one or more recycle feeds, such as at least a portion of light cycle oil from reactor effluents, and one or more co-feeds, including steam and/or oxygenates. In certain embodiments "hydrocarbon reactants" refer to hydrocarbons from a first hydrocarbon feed stream fed via a first feed inlet of the reactor and a second hydrocarbon feed stream fed via a second feed inlet of the reactor, which are passing through the reactor. In certain embodiments "hydrocarbon reactants" refer to hydrocarbons from a first hydrocarbon feed stream fed via a first feed inlet of the reactor and a second hydrocarbon feed stream fed via a second feed inlet of the reactor, which are passing through the reactor, and one or more co-feeds, including steam and/or oxygenates, which are passed together with the first and/or second hydrocarbon feed streams. In certain embodiments "hydrocarbon reactants" refer to hydrocarbons from a first hydrocarbon feed stream fed via a first feed inlet of the reactor and a second hydrocarbon feed stream fed via a second feed inlet of the reactor, which are passing through the reactor, and one or more recycle feeds, such as at least a portion of cycle oil (light cycle oil, heavy cycle oil or a combination thereof) from reactor effluents, which are passed together with the first and/or second hydrocarbon feed streams. In certain embodiments "hydrocarbon reactants" refer to hydrocarbons from a first hydrocarbon feed stream fed via a first feed inlet of the reactor and a second hydrocarbon feed stream fed via a second feed inlet of the reactor, which are passing through the reactor, and one or more recycle feeds, such as at least a portion of light cycle oil from reactor effluents, and one or more co-feeds, including steam and/or oxygenates, wherein the recycle and co-feeds are passed together with the first and/or second hydrocarbon feed streams.

As used in this disclosure, a "catalyst" refers to any substance which increases the rate of a specific chemical reaction. Catalysts described in this disclosure may be utilized to promote various reactions, such as, but not limited to, cracking. As used in this disclosure, "cracking" generally refers to a chemical reaction where a molecule having carbon to carbon bonds is broken into more than one molecule by the breaking of one or more of the carbon to carbon bonds, or is converted from a compound which includes a cyclic moiety, such as a cycloalkane, cycloalkene, naphthalene or the like, to a compound which does not include a cyclic moiety or contains fewer cyclic moieties than prior to cracking.

As used in this disclosure, the term "spent catalyst" refers to catalyst that has been introduced to and passed through a reaction zone to crack a hydrocarbon feed, but has not been regenerated in the regenerator following introduction to the reaction zone. The "spent catalyst" may have: coke deposited on the catalyst and may include partially coked catalyst as well as fully coked catalysts; and hydrocarbons from the feed or reaction products adsorbed or otherwise deposited on the catalysts. The amount of coke deposited and hydrocarbons adsorbed on the "spent catalyst" may be greater than the amount of coke and hydrocarbons remaining on the regenerated catalyst following regeneration. As used in this disclosure, the "spent catalyst" may have adsorbed hydrocarbons removed in a steam stripping zone in fluid communication with a reaction zone, and spent catalyst containing coke is subjected to regeneration.

As used in this disclosure, the term "regenerated catalyst" refers to catalyst that has been introduced to a reaction zone and then regenerated in a regenerator to heat the catalyst to a greater temperature, oxidize and remove at least a portion of the coke from the catalyst to restore at least a portion of the catalytic activity of the catalyst, or both. The "regenerated catalyst" may have less coke, a greater temperature, or both compared to spent catalyst and may have greater catalytic activity compared to spent catalyst. The "regenerated catalyst" may have more coke and lesser catalytic activity compared to fresh catalyst that has not passed through a cracking reaction zone and regenerator.

As used in this disclosure, the term "stream" (and variations of this term, such as hydrocarbon stream, hydrocarbon feed stream, feedstream, product stream, and the like), unless otherwise specified, may include one or more of various hydrocarbon compounds, such as straight chain, branched or cyclical alkanes, alkenes, alkadienes, alkynes, alkylaromatics, alkenyl aromatics, condensed and non-condensed di-, tri- and tetra-aromatics, and gases such as hydrogen and methane, $C_2$+ hydrocarbons and further may include various impurities. The term "$C_\#$ hydrocarbons" or "$C_\#$", is used herein having its well-known meaning, that is, wherein "#" is an integer value, and means hydrocarbons having that value of carbon atoms. The term "$C_\#$+ hydrocarbons" or "$C_\#$+" refers to hydrocarbons having that value or more carbon atoms. The term "$C_\#$- hydrocarbons" or "$C_\#$-" refers to hydrocarbons having that value or less carbon atoms. Similarly, ranges are also set forth, for instance, $C_1$-$C_3$ means a mixture comprising $C_1$, $C_2$ and $C_3$.

The term "crude oil" as used herein refers to a naturally occurring mixture of petroleum liquids and gasses, which can be extracted from geologic formations and can be provided in its unrefined form. Crude oil suitable as the source material for the processes herein include Arabian Heavy, Arabian Light, Arabian Extra Light, other Gulf crudes, Brent, North Sea crudes, North and West African crudes, Indonesian, Chinese crudes, North or South American crudes, Russian and Central Asian crudes, or mixtures thereof. The crude petroleum mixtures can be whole range crude oil or topped crude oil. As used herein, "crude oil" also refers to such mixtures that have undergone some pretreatment such as water-oil separation; and/or gas-oil separation; and/or desalting; and/or stabilization. In certain embodiments, crude oil refers to any of such mixtures having an API gravity (ASTM D287 standard), of greater than or equal to about 30°, 32°, 34°, 36°, 38°, 40°, 42° or 44°, including those having an API gravity of from 25° to such as from 25° to 30°, from 30° to 35°, from 35° to 40°, or any combination of these ranges.

As used in this disclosure, all boiling point ranges relative to hydrocarbon fractions derived from crude oil via atmospheric and/or vacuum distillation shall refer to True Boiling Point values obtained from a crude oil assay, or a commercially acceptable equivalent. The modifying term "straight run" is used herein having its well-known meaning, that is, describing fractions derived directly from the atmospheric distillation unit, optionally subjected to steam stripping, without other refinery treatment such as hydroprocessing, fluid catalytic cracking or steam cracking.

As used in this disclosure the acronym "LPG" as used herein refers to the well-known acronym for the term "liquefied petroleum gas," and generally is a mixture of $C_3$-$C_4$ hydrocarbons. In certain embodiments, these are also referred to as "light ends." The term "naphtha" as used herein refers to hydrocarbons having a nominal boiling range of about 20-210, 20-190, 20-180, 20-170, 25-210, 25-205, 25-190, 25-180, 25-170, 32-210, 32-205, 32-190, 32-180, 32-170, 35-210, 35-205, 35-190, 35-180 or 35-170° C. The term "light naphtha" as used herein refers to hydrocarbons having a nominal boiling range of about 20-110, 20-100, 20-20-85, 25-110, 25-100, 25-90, 25-85, 32-110, 32-100, 32-90, 32-85, 35-110, 35-100, 35-90 or The term "heavy naphtha" as used herein refers to hydrocarbons having a nominal boiling range of about 85-210, 85-205, 85-190, 85-180, 85-170, 90-210, 90-205, 90-190, 90-180, 95-210, 95-205, 95-190, 95-180, 95-170, 100-210, 100-205, 100-193, 100-190, 100-180, 100-170, 110-210, 110-205, 110-193, 110-190, 110-180 or 110-170° C. In certain embodiments naphtha, light naphtha and/or heavy naphtha refer to such petroleum fractions obtained by crude oil distillation, or distillation of intermediate refinery processes. The term "kerosene" as used herein refers to hydrocarbons having a nominal boiling range of about 160-280, 160-270, 160-260, 170-280, 170-270, 170-260, 180-280, 180-270, 180-260, 190-280, 190-270, 190-260, 193-280, 193-270 or 193-260° C. In certain embodiments, the term "middle distillate" is used with reference to one or more fractions containing hydrocarbons having a nominal boiling range of about 160-400, 160-380, 160-370, 160-360, 160-340, 170-400, 170-380, 170-370, 170-360, 170-340, 180-400, 180-380, 180-370, 180-360, 180-340, 190-400, 190-380, 190-370, 190-360, 190-340, 193-400, 193-380, 193-370, 193-360, or 193-340° C. In certain embodiments, the term "straight run middle distillate" is used with reference to one or more straight run fractions from the atmospheric distillation unit. In embodiments in which other terminology is used herein, the middle distillate fraction can also include all or a portion of atmospheric gas oil range hydrocarbons and/or all or a portion of kerosene. In additional embodiments, term "middle distillate" is used to refer to fractions from one or more operations boiling in this range. The term "atmospheric residue" as used herein refer to the bottom hydrocarbons having an initial boiling point corresponding to the end point of the AGO range hydrocarbons, and having an end point based on the characteristics of the crude oil feed. The term "vacuum gas oil" as used herein refer to hydrocarbons having a nominal boiling range of about 370-565, 370-550, 370-540, 370-530, 370-510, 400-565, 400-550, 400-540, 400-530, 400-510, 420-565, 420-550, 420-540, 420-530 or 420-510° C. The term "vacuum residue" as used herein refer to the bottom hydrocarbons having an initial boiling point corresponding to the end point of the vacuum gas oil range hydrocarbons, and having an end point based on the characteristics of the crude oil feed.

The term "condensates" refers to hydrocarbons separated from natural gas stream. As used herein, "condensates" also refers to such mixtures that have undergone some pretreatment such as water-oil separation; and/or gas-oil separation; and/or desalting; and/or stabilization. In certain embodiments, condensates refer to any of such mixtures having an API gravity (ASTM D287 standard), of greater than or equal to about 45, 50, 60, or 65°.

The term "cycle oil" is used herein to refer to a mixture of light cycle oil and heavy cycle oil. The term "light cycle oil" and its acronym "LCO" as used herein refers to the light cycle oil produced by conventional FCC units, and is also used to refer to corresponding ranges of hydrocarbons from the countercurrent multizone fluidized bed reactor herein. The nominal boiling range for LCO is, for example, in the range of about 215-350, 216-350, 220-350, 215-343, 216-343, 220-343, 215-330, 216-330 or 220-330° C. The term "heavy cycle oil" and its acronym "HCO" as used herein refer to the heavy cycle oil which is produced by conventional FCC units, and is also used to refer to corresponding ranges of hydrocarbons from the countercurrent multizone fluidized bed reactor. The nominal boiling range for HCO is, for example, in the range of about 330+, 343+ or 350+, for instance 330-530, 330-510, 343-530, 343-510, 350-530 or 350-510° C.

Conventional FCC processes operate with a relatively low catalyst hold up in the reactor by utilizing lean bed or circulating fluidization regimes, such as dilute fluidized beds. Additionally, conventional catalytic cracking processes may utilize co-current flow patterns whereby the catalyst and hydrocarbons flow through the reactor in the same direction, which can result in undesirable flow patterns such as back-mixing and core-annular flow. Embodiments of the present disclosure are directed to methods to produce light olefins by catalytic cracking, where the catalyst and hydrocarbons contact each other in a counter-current manner and where a portion of the reactor operates with a dense bed fluidization regime. Dense bed fluidization may allow more catalyst to be present in the reactor, which in turn may lead to higher conversion of the hydrocarbon and higher yield of light olefins than observed in traditional catalytic cracking processes. Counter-current flow may be describable to increase the conversion of the feed. For example, during counter-current flow, fresh catalyst may move from the top of the reactor to the bottom of the reactor while hydrocarbon feed flows from the bottom to the top of the reactor. The spent catalyst at the bottom of the reactor and nearing the exit of the reactor contacts with the feed flowing upward and converts the reactive components in the feed including the heavy fraction of the feed). The less reactive components in the feed are converted as the feed travels upward, contacting the hot and fresh catalyst in the top section of the reactor. Additionally, counter-current contact between the hydrocarbons and catalyst may prevent back-mixing or core-annular flow, which are often leads to a reduced yield of light olefins in traditional FCC riser reactors where the catalyst and hydrocarbons flow through the reactor co-currently.

Figure 2:
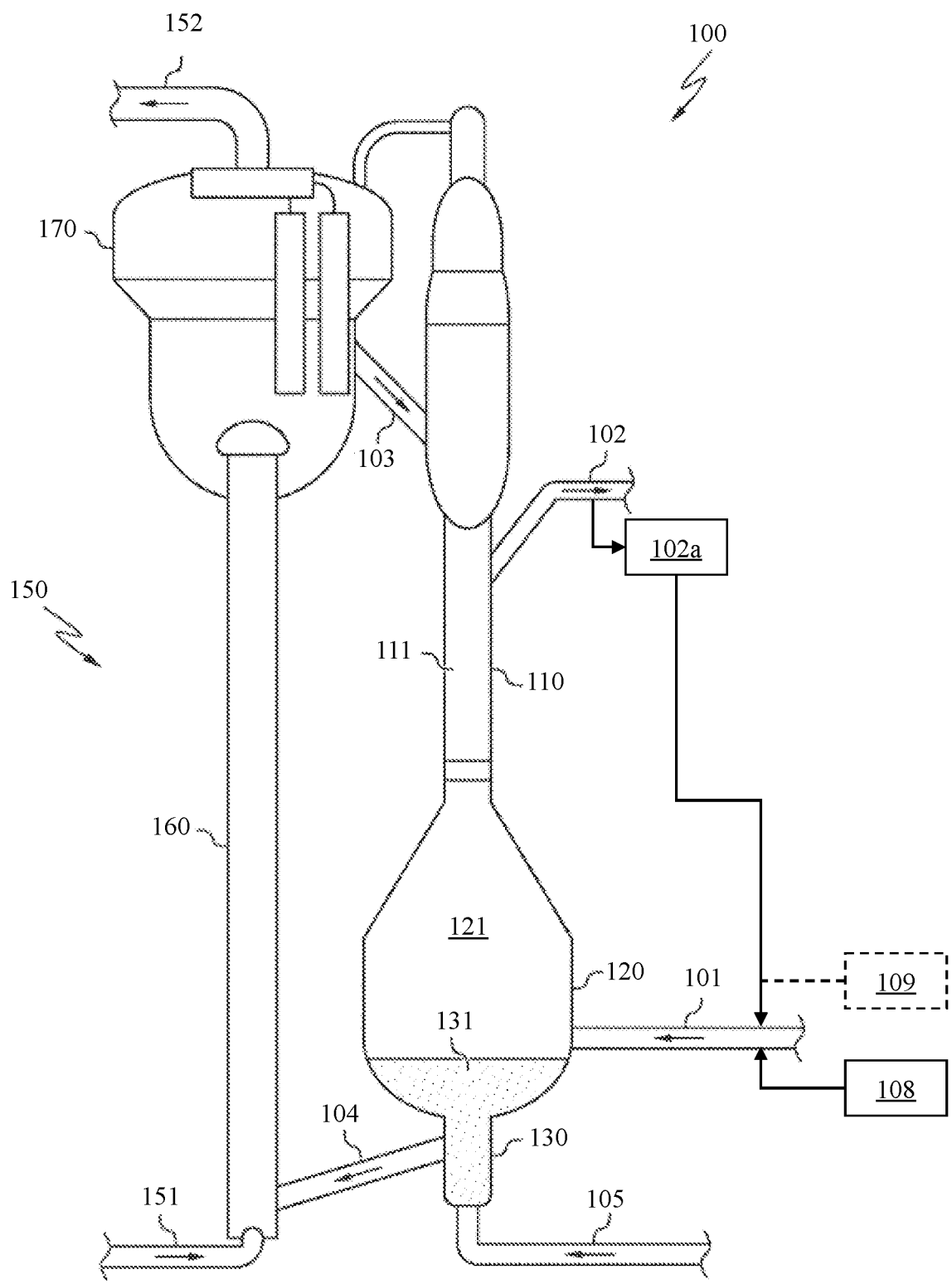
FIG. 2 schematically depicts a reactor and catalyst regenerator for producing light olefins according to one or more further embodiments.

Referring now to FIGS. 1 and 2, a reactor 100 for producing light olefins using catalyst formulations or mixtures disclosed herein is schematically depicted. The reactor comprises an upper reactor portion 110, a lower reactor portion 120, and a steam stripping portion 130. The upper reactor portion 110 defines an upper reaction zone 111 and the lower reactor portion 120 defines a lower reaction zone 121. In certain embodiments, operation of reactor 100 includes a primary hydrocarbon feed stream 108 which enters the lower reaction zone 121 through one or more feed inlets 101 located in the lower reactor portion 120. The one or more feed inlets may be positioned at or near the bottom of the lower reactor portion 120. Additionally, the lower reactor portion 120 may comprise one or more catalyst outlets for discharging a stream 104 of spent catalyst, positioned at or near the bottom of the lower reactor portion 120. As described herein, at or near the bottom of the lower reactor portion 120 corresponds to positions in the bottom 10%, bottom 5%, or bottom 1% of the height of the lower reactor portion 120.

In certain optional embodiments, as shown in dashed lines in FIG. 1, a co-feed 109 is introduced with the primary hydrocarbon feed stream 108 through one or more feed inlets 101 located in the lower reactor portion 120. In certain embodiments, a co-feed 109 is fed to the reactor via the same feed inlet 101 as the hydrocarbon feed stream 108.

In certain embodiments, as shown with respect to FIG. 2, a recycle stream 102a is introduced with the primary hydrocarbon feed stream 108 through one or more feed inlets 101 located in the lower reactor portion 120. In certain embodiments, a recycle stream 102a is fed to the reactor via the same feed inlet 101 as the hydrocarbon feed stream 108. In addition, optional embodiments as shown in FIG. 2 also include a co-feed 109 (shown in dashed lines) that is introduced with the primary hydrocarbon feed stream 108 and the recycle stream 102a through one or more feed inlets 101.

Figure 3:
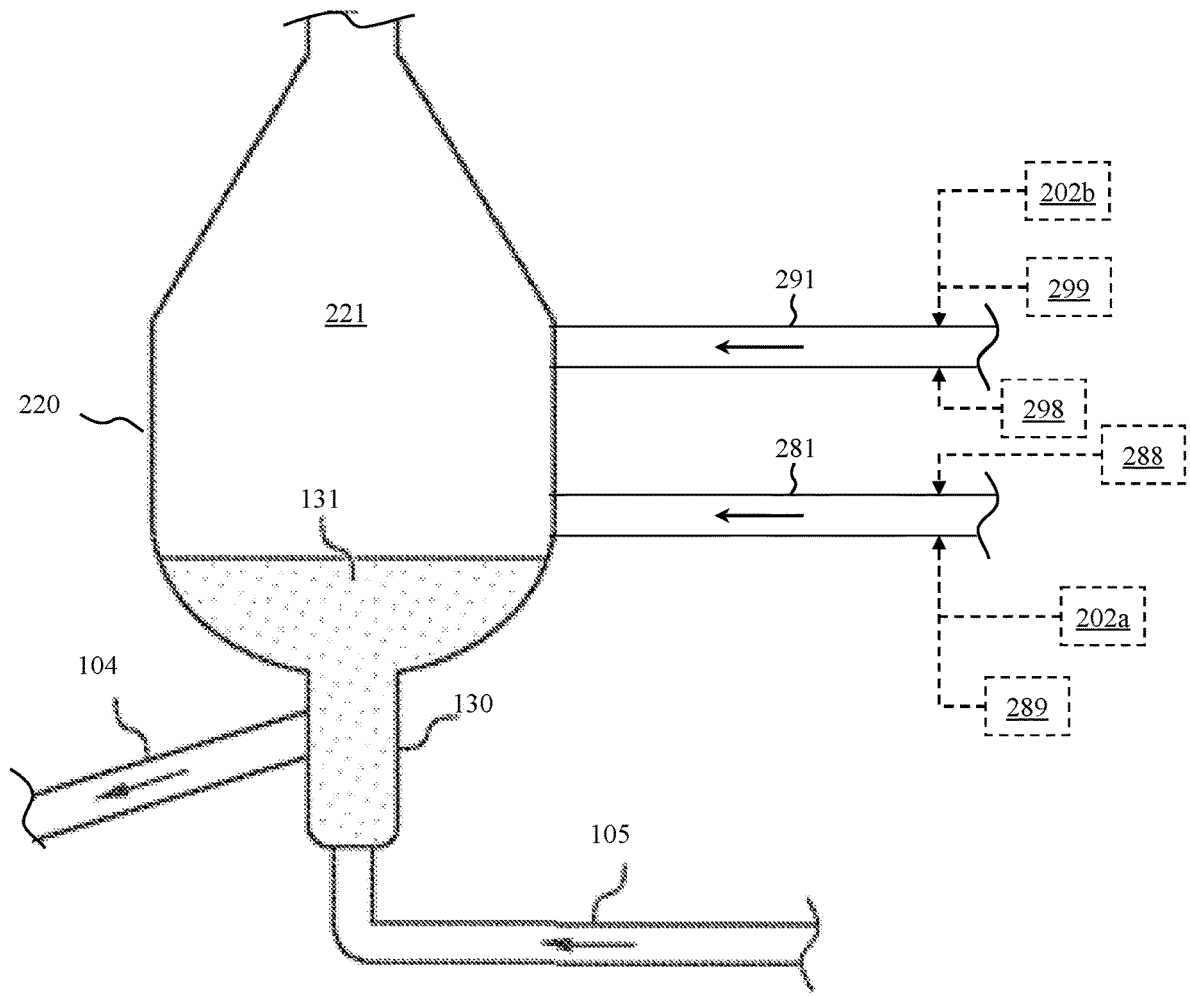
FIG. 3 schematically the lower reactor portion of a reactor for producing light olefins according to one or more additional embodiments disclosed herein.

In certain embodiments, as shown with respect to FIG. 3, another embodiment of a lower reactor portion, lower reactor portion 220, is provided, that can be used with other components of the reactor 100 of FIGS. 1 and 2, or with the reactor described in US20.220033714A1. The lower reactor portion 220 defines a lower reaction zone 221, and includes one or more first inlets 281 and one or more second inlets 291. The one or more first feed inlets 281 may be positioned at or near the bottom of the lower reactor portion 220. The one or more second feed inlets 291 may be positioned mid-height of the lower reactor portion 220 or positioned at or near the top of the lower reactor portion 220. In certain embodiments, one inlet is provided as a first feed inlet 281, and one inlet is provided as a second feed inlet 291. As described herein, at or near the bottom of the lower reactor portion 220 corresponds to positions in the bottom 10%, bottom 5%, or bottom 1% of the height of the lower reactor portion 220. As described herein, at or near the top of the lower reactor portion 220 corresponds to positions in the top 10%, top 5%, or top 1% of the height of the lower reactor portion 220. As described herein, positioned mid-height of the lower reactor portion 220 to positions from the bottom 1.5%, bottom 25%, or bottom 35% of the height of the lower reactor portion 220 spanning to positions from the top 15%, top 25%, or top 35% of the height of the lower reactor portion 220; for example, an inlet positioned mid-height of the lower reactor portion 220 may be in a location between the bottom 15% to the top 15%, the bottom 25% to the top 25% or the bottom 35% to the top 35%.

A feed to the one or more first inlets 281 include one or more of: a first hydrocarbon feed stream 288, a recycle stream 202a, or a co-feed 289 (or plural co-feeds 289). In certain embodiments a feed to the one or more first inlets 281 include a first hydrocarbon feed stream 288. In certain embodiments the feed to the one or more first inlets 281 include the first hydrocarbon feed stream 288 and the co-feed 289 (or plural co-feeds 289). In certain embodiments the feeds to the one or more first inlets 281 include the first hydrocarbon feed stream 288 and the recycle stream 202a. In certain embodiments the feed to the one or more first inlets 281 include a first hydrocarbon feed stream 288, a recycle stream 202a, and a co-feed 289 (or plural co-feeds 289). In certain embodiments the feed to the one or more first inlets 281 include the recycle stream 202a. In certain embodiments the feed to the one or more first inlets 281 include the recycle stream 202a and a co-feed 289 (or plural co-feeds 289).

A feed to the one or more second inlets 291 include one or more of: a second hydrocarbon feed stream 298, a recycle stream 202b, or a co-feed 299 (or plural co-feeds 299). In certain embodiments a feed to the one or more second inlets 291 include a second hydrocarbon feed stream 298. In certain embodiments the feed to the one or more second inlets 291 include the second hydrocarbon feed stream 298 and the co-feed 299 (or plural co-feeds 299). In certain embodiments the feed to the one or more second inlets 291 include the second hydrocarbon feed stream 298 and the recycle stream 2020. In certain embodiments the teed to the one or more second inlets 291 include a second hydrocarbon feed stream 298, a recycle stream 2020, and a co-feed 299 (or plural co-feeds 299). In certain embodiments the feed to the one or more second inlets 291 include the recycle stream 2020. In certain embodiments the feed to the one or more second inlets 291 include a recycle stream 2020 and a co-feed 299 (or plural co-feeds 299).

With continued reference to FIGS. 1 and 2, and also to FIG. 3, the upper reactor portion 110 defines an upper reaction zone 111. In operation the hydrocarbon reactants move through the lower reaction zone 121 or 221 and into the upper reaction zone 111. The upper reactor portion 110 and the lower reactor portion 120 or 220 are in fluid communication with each other. In one or more embodiments, the upper reactor portion 110 and the lower reactor portion 120 or 220 may be adjacent to each other, with no intervening components or reactor portions, whereby the upper reactor portion 110 and the lower reactor portion 120 or 220 are in direct fluid communication with each other. In one or more embodiments, the hydrocarbon reactants pass directly from the lower reactor portion 120 or 220 to the upper reactor portion 110.

Figure 4:
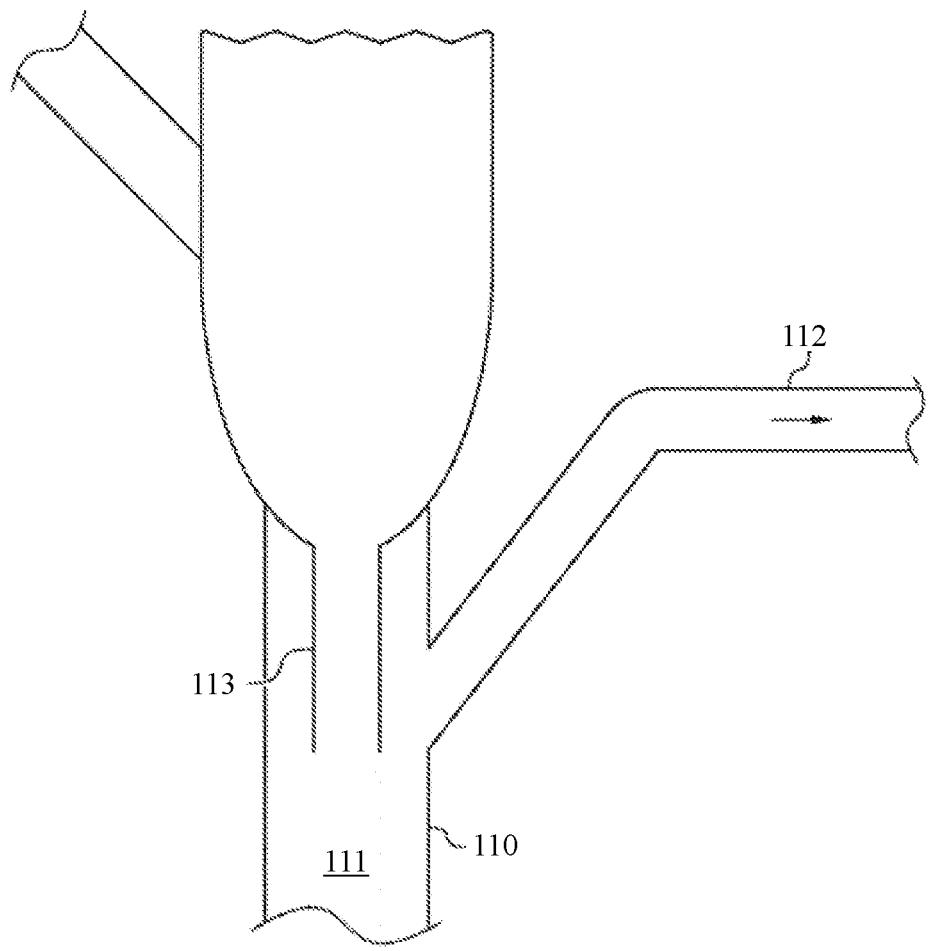
FIG. 4 schematically depicts a cross-sectional view of the upper reactor portion of a reactor for producing light olefins according to one or more embodiments disclosed herein.

Referring to FIG. 4, a cross-sectional view of the upper reactor portion 110 is shown. The upper reactor portion 110 includes a reactor effluent outlet 112 and a catalyst inlet 113, which are positioned at or near the top of the upper reactor portion 110. As described herein, at or near the top of the upper reactor portion 110 corresponds to positions in the top 10%, top 5%, or top 1% of the height of the upper reactor portion 110. Catalyst may enter the upper reactor portion 110 through catalyst inlet 113. As shown in FIG. 4, the catalyst inlet 113 may extend into the upper reactor portion 110 so the catalyst enters the upper reaction zone 111 below the hydrocarbon product outlet 112. Also as shown in FIG. 4, the hydrocarbon product outlet 112 is defined by an opening in the upper reactor portion 110, and the hydrocarbon product outlet 112 does not extend into upper reaction zone 111. Thus, catalyst may enter the upper reaction zone below the hydrocarbon outlet 112. Without wishing to be bound by theory, it is believed that introducing the catalyst below the hydrocarbon product outlet 112 may reduce the amount of catalyst entrained in the hydrocarbon product exiting the reactor 100.

As shown in FIGS. 1-3, the lower reactor portion 120 or 220 may have a larger cross-sectional area than the upper reactor portion 110. In certain embodiments, the lower portion 120 or 220 and the lower reaction zone 121 or 221 is characterized by a shape that is a cylindrical portion. In one or more embodiments, the lower reactor portion 120 or 220 may have a substantially similar cross-sectional area to the upper reactor portion 110. In certain embodiments, the lower portion 120 or 220 and the lower reaction zone 121 or 221 is characterized by a shape that is a cylindrical portion surmounted with a frustoconical portion. In either embodiment, when referring to the position of the one or more first feed inlets 281 and the one or more second feed inlets 291, the percentages of height as related to the bottom height, mid-height and the top height refer to the height along the cylindrical portion of the lower reactor portion 220.

In one or more embodiments, the upper reaction zone 111 may operate in a counter-current plug flow regime. In one or more embodiments, the hydrocarbon reactants may exhibit plug flow as they move up through the upper reaction zone 11.1. Likewise, the catalyst may exhibit plug flow as it moves down through the upper reaction zone 111. Since the flow of catalyst is opposed to the flow of the hydrocarbon feed, the flows are counter-current and the upper reaction zone 111 may operate in a counter-current plug flow regime.

In one or more embodiments, the catalyst-to-oil ratio in the upper reaction zone 111 may be from about 5-100. For example, the catalyst-to-oil ratio in the upper reaction zone 111 may be from about 5-100, 10-100, 20-100, 30-100, 40-100, 50-100, 60-100, 70-100, 80-100, 90-100, 5-90, 5-80, 5-70, 5-60, 5-50, 5-40, 5030, 5-20 or 5-10, Without wishing to be bound by theory, it is believed that there is less constraint on catalyst-to-oil ratios suitable for use in the upper reaction zone 111 because the catalyst may flow through the upper reaction zone 111 by gravity instead of being transported through the reactor by the flow of hydrocarbons. Additionally, a high catalyst-to-oil ratio indicates a large amount of catalyst within the upper reaction zone 111, which is believed to lead to increased conversion of the hydrocarbon feed to light olefins.

The catalyst may move through the upper reaction zone 111 and into the lower reaction zone 121 or 221. In one or more embodiments, the catalyst may pass directly from the upper reaction zone 111 to the lower reaction zone 121 or 221. The lower reaction zone 121 or 221 may operate in a dense bed fluidization regime. In one or more embodiments, the catalyst may pass from the upper reaction zone 111 to the lower reaction zone 121 or 221 and form a dense fluidized bed in the lower reaction zone 121 or 221. As described herein, a "dense bed fluidization regime" refers to fluidization regimes in which the fluidized bed has a clearly defined upper limit or surface to the dense bed. For example, dense bed fluidization regimes include the smooth fluidization, bubbling fluidization, slugging fluidization, and turbulent fluidization regimes. In a dense fluidized bed, the particle entrainment rate may be low, but may increase as the velocity of the gas flowing through the bed increases.

In one or more embodiments, the initial hydrocarbon feed stream 108, or the first hydrocarbon feed stream 288 and/or the second hydrocarbon feed stream 298, may comprise, consist of, or consist essentially of crude oil. In further embodiments, the initial hydrocarbon feed stream 108, or the first hydrocarbon feed stream 288 and/or the second hydrocarbon feed stream 298, may comprise, consist of, or consist essentially of a fraction of crude oil, or a petrochemical product formed from a crude oil, having an initial boiling point of at least 25° C. For example, in one or more embodiments, the initial hydrocarbon feed stream 108, or the first hydrocarbon feed stream 298 and/or the second hydrocarbon feed stream 298, may comprise, consist of, or consist essentially of light naphtha and may have an initial boiling point from about 20° C. to about 35° C. and a final boiling point of from about 85° C. to about 110° C. In one or more embodiments, the initial hydrocarbon feed stream 108, or the first hydrocarbon feed stream 288 and/or the second hydrocarbon feed stream 298, may comprise, consist of, or consist essentially of heavy naphtha and may have an initial boiling point from about 85° C. to about 110° C. and a final boiling point from about 170° C. to about 210° C. In further embodiments, the initial hydrocarbon feed stream 108, or the first hydrocarbon feed stream 288 and/or the second hydrocarbon feed stream 298, may comprise, consist of, or consist essentially of full range naphtha and have an initial boiling point from about 20° C. to 35° C. and a final boiling point from about 170° C. to about 210° C.

In one or more embodiments, the initial hydrocarbon feed stream 108, or the first hydrocarbon feed stream 288 and/or the second hydrocarbon feed stream 298, may comprise, consist of, or consist essentially of one or more of $C_4$ components, light naphtha, heavy naphtha, full range naphtha, vacuum gas oil, crude oil, FCC gasoline, olefinic naphtha, atmospheric residue, vacuum residue, condensate, deasphalted crude oil, dewaxed crude oil, deasphalted-dewaxed crude oil, middle distillates, or kerosene.

In one or more embodiments, a co-feed 109 as in the embodiment of FIG. 1, an optional co-feed 109 as in the embodiment of FIG. 2, an optional co-feed 209 as in the embodiment of FIG. 3, and/or an optional co-feed 289 as in the embodiment of FIG. 3, comprises steam in embodiment in which steam is provided as a co-feed, it is provided in an amount of about 1 to 150 mass percent of the co-feed relative to a mass of the initial hydrocarbon feed, for example, in an amount of about 1 wt. %, 5 wt. %, 10 wt. %, 20 wt. %, 30 wt. %, 40 wt. %, 50 wt. %, 60 wt. %, 70 wt. %, 80 wt. %, 90 wt. %, 100 wt. %, 110 wt. %, 120 wt. %, 130 wt. %, 140 wt. % or any amount between about 1 to 150, 10 to 150, 20 to 150, 10 to 100, 10 to 70 or 10 to 40 wt. %.

In one or more embodiments, a co-feed 109 as in the embodiment of FIG. 1, an optional co-feed 109 as in the embodiment of FIG. 2, an optional co-feed 209 as in the embodiment of FIG. 3, and/or an optional co-feed 289 as in the embodiment of FIG. 3, comprises one or more oxygenates. In embodiment in which oxygenates are provided as a co-feed, it is provided in an amount of about 1 to 50 wt. % by mass relative to the mass of the initial hydrocarbon feed, for example, of about 1 wt. %, 5 wt. %, 10 wt. %, 15 wt. %, 20 wt. %, 25 wt. %, 30 wt. %, 35 wt. %, 40 wt. %, 45 wt. %, 50 wt. % or any amount between about 1 to 50 wt. %. In one or more embodiments, oxygenates may comprise one or more alcohols, ketones or aldehydes. In one or more embodiments, an oxygenate may comprise methanol.

In one or more embodiments, a recycle stream 102a, or a recycle stream 202a and/or a recycle stream 202b, comprise at least a portion of other reaction products derived from the hydrocarbon product stream 102. In one or more embodiments, the hydrocarbon product stream 102 is fractioned into one or more fractions of light naphtha, non-aromatic naphtha, medium naphtha, heavy naphtha, light cycle oil, heavy cycle oil, or heavy oil, a fraction rich in olefinic butenes, and any one or more of said fractions comprise the recycle stream 102a, or 202a and/or 202b. In certain embodiments, the recycle stream 102a, or 202a and/or 202b, comprises, consists of or consists essentially of light cycle oil. In certain embodiments, the recycle stream 102a, or 202a and/or 202b, is provided in an amount of about 1 to 20 wt. % by mass relative to the mass of the initial hydrocarbon feed, for example, about 1 wt. %, 2 wt. %, 5 wt. %, 10 wt. %, 15 wt. %, 20 wt. % or any amount between about 1 to 20, 5 to 20 or 10 to 20 wt. %.

In certain embodiments, the recycle stream 102a, or 202a and/or 202b, comprises non-aromatic light naphtha including butenes (with some of butane and isobutane). In certain embodiments, the recycle stream 102a, or 202a and/or 202b, is provided in an amount of about 1 to 50 wt. % by mass relative to the mass of the initial hydrocarbon feed, for example, about 1 wt. %, 2 wt. %, 5 wt. %, 10 wt. %, 15 wt. %, 20 wt. %, 25 wt. %, 30 wt. %, 35 wt. % or any amount between about 1 to 50, 5 to 50, 10 to 50 or 20 to 50 wt. %.

With reference to FIG. 2, the recycle stream 102a is introduced with the feed stream 108 and optionally one or more co-feeds 109. In certain embodiments, the recycle stream 102a is combined with the initial feed stream 108. In certain embodiments, the recycle stream 102a is combined with the initial feed stream 108 and a co-feed 109 (or plural co-feeds). In certain embodiments, the recycle stream 102a is combined with the initial feed stream 108 and a co-feed 109 of steam. In certain embodiments, the recycle stream 102a is combined with the initial feed stream 108 and a co-feed 109 of one or more oxygenates. In certain embodiments, the recycle stream 102a is combined with the initial feed stream 108 and a co-feed 109 of steam and one or more oxygenates.

With reference to FIG. 3, the first inlet 281 and the second inlet 291 may receive the same or different feeds. As described herein, more active catalyst is towards the top of the lower reaction zone (zone 221 in the example of FIG. 3).

In certain embodiments, an initial feed stream is divided by volume or mass, with a first portion passing to the first inlet 281 as the first hydrocarbon feed stream 288, and a second portion passing to the second inlet 291 as the second hydrocarbon feed stream 298.

In certain embodiments, an initial feed stream is fractioned based on nominal boiling point, wherein a first portion having one or more first boiling point range(s) is passed to the first inlet 281 as the first hydrocarbon feed stream 288, and wherein a second portion having one or more second boiling point range(s) is passed to the second inlet 291 as the second hydrocarbon feed stream 298. For example, in some embodiments, an initial stream can be fractioned into a light portion and a heavy portion, whereby the first hydrocarbon feed stream 288 comprises the light portion and the second hydrocarbon feed stream 298 comprises a heavy portion. In certain embodiments, a cut point between a light and heavy portion is in the range of about 200-375° C., for example about 200, 225, 250, 275, 300, 325, 350 or 375. In some embodiments, a light portion may comprise naphtha range hydrocarbons, for example olefinic rich C4-C6 hydrocarbons, and a heavy portion may comprise the initial feed stream such as crude oil or another initial hydrocarbon feed stream, for instance initial hydrocarbon feed stream 108 above.

In one or more embodiments, the catalyst may comprise a zeolite catalyst, for example, USY zeolite, ZSM-5 zeolite, or a combination of multiple types of suitable zeolite catalysts. Alternatively, the catalyst may comprise other suitable solid acid catalysts. In one or more embodiments, the catalyst may comprise fresh catalyst, regenerated catalyst, or combinations of fresh and regenerated catalyst as described in further detail herein. In one or more embodiments, the catalyst may comprise binders, promotors, inert, and matrix to have acceptable physical and chemical properties such as catalyst attrition index and catalyst density so that it can be used in the proposed reactor configuration.

In certain embodiments, catalyst particles for use in the systems and methods disclosed herein to process hydrocarbons for production of light olefins comprise a mixture that is a physically mixed combination of separate catalyst particles of at least first composite particles and second composite particles. The first composite particles comprises about 5-70, 5-50, 5-45, 10-70, 10-50, 10-45, 20-50 or 20-45 wt. % of a 10-member ring zeolite component; about 5-70, 5-50, 10-50, 5-30 or 5-25 wt. % of a first binder component, about 10-60, 10-50 or 10-40 wt. % of a first filler component; and 0-40, 5-40, 5-30, 5-25, 15-40, 15-30 or 15-25 wt. % of an optional first additive component (where the lower limit of 0 wt. % represents absence of the additive component). The 10-member ring zeolite component of the first composite particles optionally may be modified with phosphorous. The second composite particles comprise: about 5-70, 5-50, 5-45, 10-70, 10-50, 10-45, 20-50 or 20-45 wt. % of a 12-member ring zeolite component, about 5-70, 5-50, 10-50, 5-30 or 5-25 wt. % of a second binder component, about 10-60, 10-50 or 10-40 wt. % of a second filler component; and about 0-40, 5-40, 5-30, 5-25, 15-40, 15-30 or 15-25 wt. % of an optional second additive component (where the lower limit of 0 wt. % represents absence of the additive component) in such embodiments the type and amount of the first binder component and the second binder component in each of the different first and second composite particles may be the same or different; the type and amount of the first and second filler component in each of the different first and second composite particles may be the same or different, and the type and amount (including absence of an additive component) of the first and second optional additive component in each of the different first and second composite particles may be the same or different.

In certain embodiments, catalyst particles for use in the systems and methods disclosed herein to process hydrocarbons for production of light olefins comprise multi-zeolite composite particles. The multi-zeolite composite particles comprise: about 5-75, 5-40, 5-30, 5-25, 10-40, 10-30, 10-25, 15-40, 15-30 or 15-25 wt. % of a 10-member ring zeolite component modified with phosphorous, about 5-75, 5-40, 5-30, 5-25, 10-40, 10-30, 15-40, 15-30 or 20-40 wt. % of a 12-member ring zeolite component, about 5-70, 5-50, 10-50, 5-30 or 5-25 wt. % of a binder component, about 10-60, 10-50, 10-40 wt. % of an optional filler component; and about 0-40, 5-40, 5-30, 5-25, 15-40, 15-30 or 15-25 wt. % of an additive component (where the lower limit of 0 wt. % represents absence of the additive component).

Embodiments of the separate catalyst particles of at least first composite particles and second composite particles, or of the multi-zeolite composite particles, include a binder component. The binder component may be an amorphous component selected from the group consisting of alumina (including γ alumina), silica, alumina-silicate, silica-aluminate, alumina phosphate and combinations comprising two or more of said amorphous binder components.

Embodiments of the separate catalyst particles of at least first composite particles and second composite particles, or of the multi-zeolite composite particles, include a filler component. The filler component may be a clay selected from the group consisting of kaolin, sepiolite, talc, attapulgite, montmorillonite and a mixture of two or more of said clay filler components. In certain embodiments, a phosphorous stabilizer (for example diammonium phosphate or sodium hexametaphosphate) is combined with the clay component. In certain embodiments, the clay filler component possesses a surface are in the range of about 20-30 $m^2/g$ (kaolin), 200-300 $m^2/g$ (sepiolite), 2-40 $m^2/g$ (talc), 250-300 (attapulgite) or 250-400 $m^2/g$ (montmorillonite).

Embodiments of the separate catalyst particles of at least first composite particles and second composite particles, or of the multi-zeolite composite particles include an optional additive component. The optional additive component is selected from the group consisting of metal carbides (including silicon carbide), rare earth metals (including cerium and lanthanum), alkali metals (including sodium), alkaline earth metals, and metal oxides (including ferric oxide and cupric oxide). In certain embodiments, silicon carbide is used as an additive component, which may be provided having a given diameter in the range of about 1-1000, 100-1000, 200-1000, 500-1000, 1-900, 100-900, 200-900 or 500-900 nanometers, for example in certain non-limiting examples herein a given diameter of silicon carbide particles is about 800 nanometers. The use silicon carbide as an additive component results in an increase of density and/or an improvement of the thermal conductivity across the catalyst body compared to particles formed in the absence of the silicon carbide additive component.

the above embodiments of the first composite particles and second composite particles, or of the multi-zeolite composite particles, the 10-member ring zeolite component (also referred to as a medium-pore zeolite) is characterized by micropores having pore diameter in the range of about 0.45-0.6 nanometers. In certain embodiments the 10-member ring zeolite comprises a ferrierite (FER) or pentasil (MFI) framework. In certain embodiments, a zeolite having a pentasil (MFI) framework is used and comprises Zeolite Socony Mobil-5 (ZSM-5), or a or modified ZSM-5 which is modified by mesoporization.

In embodiments in which the 10-member ring zeolite is modified by phosphorus, a quantity of the 10-member ring zeolite is contacted with a modification precursor such as phosphoric acid to form a dispersion that is dried and calcined. For example, the contacting conditions and characteristics of the modification precursor are such that the P/Al molar ratio of the calcined phosphorus-modified catalyst is in the range of about 0.1-1, 0.1-0.8, 0.1-0.5, 0.2-1, 0.2-0.8, or 0.2-0.5. In certain embodiments a phosphorus-modified 10-member ring zeolite comprise phosphorus-modified ZSM-5. In some embodiments, $NH_4^-$ ZSM-5 is used as the 10-member ring zeolite component. In some embodiments, phosphorus-modified $NH_4^-$ ZSM-5 is used as the 10-member ring zeolite component.

In the above embodiments of the second composite particles and second composite particles, or of the multi-zeolite composite particles, the 12-member ring zeolite component (also referred to as a large-pore zeolite) is characterized by micropore diameters in the range of about 0.6-0.8 nanometers. In certain embodiments the 12-member ring zeolite component comprises a zeolite having a faujasite (FAU), mordenite (MOR) or a beta (*BEA) framework. In certain embodiments a zeolite having a faujasite (FAU) framework is used and is selected from the group consisting of ultra-stable Y (USY) zeolite, zeolite Y and zeolite X. In some embodiments. $H^+$ USY zeolite is used as the 12-member ring zeolite component.

The silica to alumina ($SiO_2/AlO_2$, "SAR") molar ratio of the zeolitic components of the catalyst particles herein can vary. For example suitable SAR values on a molar basis can generally be in the range of about 5-1000, 5-800, 5-500, 5-250, 5-100, 5-50, 10-1000, 10-800, 10-500, 10-250, 10-100 or 10-50. In certain embodiments in which the zeolite is a MFI type, such as ZSM-5, the SAR may be in the range of about 10-50. In certain embodiments in which the zeolite is a FAU zeolite such as zeolite Y, the SAR may be in the range of about 2-30.

The zeolitic components may be modified, treated or processed using methods known in the art to increase hydrothermal stability, increase accessibility (mesoporization), modify acidity, and/or add metallic functionality to manipulate the yield slate to favor specific products. For instance mesoporization may carried out on one or more of the zeolitic components to create mesoporous zeolites that retain crystalline framework of the micropores of the zeolite to allow larger molecules (for instance large than the size of the 10-membered ring) to diffuse into the catalyst for reaction. Mesoporization may comprise desilication, dealumination, steaming or any other known method to create mesopores. Additional components may also be added to a composite material used to make the catalyst particles, including but not limited to metal traps and/or sulfur adsorption agents.

The catalyst particles disclosed herein can be formed by any known methods to produce catalyst particles that are: structurally sound with mechanical integrity including acceptable strength and attrition indices; have a tap density in the range of about 0.55-1.3, 0.55-0.93, 0.8-1.3 or 0.8-0.93 grams per milliliter; possess high heat resistance without loss of mechanical integrity; possess acceptable thermal conductivity; and possess low thermal expansion (for example below about 850° C.).

For example, in some embodiments, effective quantities of the clay filler component, the zeolitic component(s), the binder component and the optional additive component are mixed into a liquid slurry and eventually a homogeneous liquid. In some embodiments, the components may be added in a stepwise procedure. For example: in some embodiments the clay filler component is formed as a homogeneous liquid, followed by addition of remaining components; in some embodiments the clay filler component is formed as a homogeneous liquid, followed by addition of the zeolitic component(s), followed by addition of the binder components (wherein the optional additive component can be added with the zeolitic component(s) and/or with the binder components). In certain embodiments, the binder component can be formed separately by dissolving a solid binder component with water, and adding that mixture to the mixture of clay filler component and other components.

In certain embodiments, the mixture is homogenized, for example by ball milling by milling the mixture with beads, for example of zirconium oxide beads, of a suitable diameter, for example 1-3 or 2 millimeters, for a suitable time, and separating the beads by filtration.

In certain embodiments the homogenized slurry formulation is spray dried to obtain the catalyst particles. Spray drying may be performed with a suitable device that injects the mixture with an atomization gas and a drying gas to a cyclone where the formed catalyst particles are dried. Dried particles of the catalyst are collected. For example, the spray drying may occur at an inlet temperature in the range of about 200-250° C.

The formed catalyst particles may be calcined at a suitable temperature, temperature ramp rate and for a suitable period of time to realize the final catalyst particles, for example at a temperature in the range of about 600-800° C.

In one or more embodiments, the weight hourly space velocity (WHSV) of the lower reaction zone 121 or 221 may be from about 1-200 hr$^{-1}$. For example, the WHSV of the lower reaction zone 121 or 221 may be from about 1-200, 1-175, 1-150, 1-125, 1-100, 1-75, 1-50, 1-25, 25-200, 50-200, 75-200, 100-200, 125-200, 150-200 or 175-200 hr$^{-1}$. WHSV may be used to describe the amount of catalyst in the dense bed of the lower reaction zone 121 or 221. Without wishing to be bound by theory, it is believed that a dense bed allows a large amount of catalyst to be present in the lower reaction zone, which may increase the yield of light olefins.

As the hydrocarbon reactants and the catalyst move through the reactor 100, the hydrocarbon reactants may have an upward superficial velocity through a horizontal cross-section of the reactor 100, and the catalyst may have a downward superficial velocity through a horizontal cross-section of the reactor 100. As described herein, "superficial velocity" refers to the velocity at which an individual phase flows through a given cross-sectional area. The bulk flow of a phase is used to determine superficial velocity of that phase; thus, individual particles or molecules within a phase may move in a direction different from, or even opposite to, the bulk flow of a phase without affecting the direction of the superficial velocity of that phase.

For example, the hydrocarbon reactants flow from the feed inlet(s) in the lower reactor portion 120 or 220 to the hydrocarbon product outlet 112 in the upper reactor portion 110. Thus, the bulk flow of hydrocarbon reactants moving through a horizontal cross-section of the reactor 100 is in an upward direction, resulting in an upward superficial velocity. Likewise, the catalyst flows from the catalyst inlet 113 to the catalyst outlet in the steam stripping portion 130 of the reactor 100, and the bulk flow of the catalyst moving through a horizontal cross-section of the reactor 100 is in a downward direction, resulting in a downward superficial velocity. In one or more embodiments, the upward superficial velocity of the hydrocarbon reactants and the downward superficial velocity of the catalyst results in a counter-current flow pattern between the hydrocarbon reactants and the catalyst. Thus, in one or more embodiments, the hydrocarbon reactants and catalyst move with a counter-current orientation.

Without wishing to be bound by theory, it is believed that contacting the hydrocarbon reactants and the catalyst in a counter-current manner may prevent back-mixing of catalyst that may occur in in traditional riser reactors and may promote undesired side reactions that negatively affect the production of light olefins. Additionally, it is believed that contacting the hydrocarbon reactants and the catalyst in a counter-current manner may prevent core-annular flow through the reactor where the catalyst has high concentration near the reactor walls and a low concentration toward the center of the reactor where a majority of the hydrocarbon flow occurs. Generally, core-annular flow reduces the amount of contact between the catalyst and the hydrocarbon, and thus, may reduce the conversion of hydrocarbon feed to light olefins.

Without wishing to be bound by theory, it is also believed that counter-current flow may also result in increased yield of olefins by allowing the more reactive chemicals in the hydrocarbon feed to contact less active catalyst, and less active catalyst to contact more reactive chemicals in the hydrocarbon feed Generally, the catalyst in the lower reaction zone 121 or 221 has already contacted hydrocarbons in the upper reaction zone 111. Thus, the catalyst in the lower reaction zone 121 or 221 is usually partially spent and has a lower activity than the catalyst in the upper reaction zone 111. Contacting the hydrocarbon feed with a large amount of less active catalyst in the lower reaction zone 121 or 221 may allow the more reactive chemicals in the hydrocarbon feed to crack in the lower reaction zone 121 or 221 while contacting the less active catalyst. This in turn allows the more active catalyst in the upper reaction zone 111 to crack the less reactive chemicals in the hydrocarbon feed, increasing the yield of light olefins produced from the hydrocarbon feed.

In one or more embodiments, the superficial velocity of the hydrocarbon feed stream 101 moving through the upper reactor portion 111 is 10 m/s or less. For example, the superficial velocity of the hydrocarbon feed stream through the upper reactor portion 111 may be less than or equal to 10.0, 9.0, 8.0, 7.0, 6.0, 5.0, 4.0, 3.0, 2.0, 1.0, 0.9, 0.8, 0.7, 0.6, 0.5 or 0.4 m/s. Without wishing to be bound by theory, it is believed that a hydrocarbon feed stream superficial velocity below 10.0 m/s within the upper reactor portion 111 may result in increased contact between the catalyst and the hydrocarbons, which may in turn lead to increased conversion of the hydrocarbon feed to light olefins, and reduced mass transfer limitation between the hydrocarbon feed and catalyst. The superficial velocity of the hydrocarbon feed stream 101 may be attained within the desired range based on design parameters of the reactor 100 including the height and diameter of the upper reactor portion 110 and the lower reactor portion 120 or 220.

In one or more embodiments, the residence time of the hydrocarbon feed stream 101 within the reactor 100 is from about 0.1-10 seconds. For example, the residence time of the hydrocarbon feed stream 101 within reactor 100 may be from about 0.1-10, 0.5-10, 1-10, 2-10, 3010, 4-10, 5-10, 6-10, 7-10, 8-10, 9-10, 0.1-9, 0.1-8, 0.1-7, 0.1-6, 0.1-5, 0.1-4, 0.1-3, 0.1-2 or 0.1-1 second(s).

As the hydrocarbon feed stream 101 contacts the catalyst, at least a portion of the hydrocarbon feed stream 101 may be cracked to form a hydrocarbon product. In one or more embodiments, the temperature within the reactor 100 may be from about 420-750° C. to facilitate the cracking of hydrocarbon feed stream 101. For example, the temperature (in ° C.) within the reactor 100 may be from about 420-750, 460-750, 500-750, 540-750, 580-750, 620-750, 660-750, 700-750, 420-670, 420-630, 420-590, 420-550, 420-510, 440-720 or 480-680.

In one or more embodiments, the hydrocarbon product may comprise light olefins and other reactions products. For example, the hydrocarbon product may comprise, ethylene, propylene, butene or combinations of these in addition to the other reactions products. In one or more embodiments, the other reaction products may comprise one or more of dry gas, aromatics, LPG, naphtha (including full range naphtha, or separate light and heavy naphtha fractions), light cycle oil, heavy cycle oil, and/or heavy oil. In one or more embodiments, a hydrocarbon product stream 102 comprising light olefins may be passed from the upper reaction zone 111 through hydrocarbon product outlet 112 in the upper reactor portion 110. In one or more embodiments, the hydrocarbon product stream 102 may comprise catalyst entrained within the hydrocarbon product stream 102 which may be separated from the hydrocarbon product stream 102 in a separation device. Any suitable separation device, including a cyclone or series of cyclones, may be used to separate entrained catalyst from the hydrocarbon product stream 102. In one or more embodiments, the light olefins may be separated from the hydrocarbon product stream 102. Separation of the light olefins from the hydrocarbon product stream may be achieved by any suitable means including, for example, distillation. In one or more embodiments, the separation of light olefins from the hydrocarbon product stream may result in relatively pure streams of ethylene, propylene, or butene.

In one or more embodiments, cracking of the hydrocarbon feed stream 101 may produce spent catalyst. Spent catalyst may be produced in both the upper reaction zone 111 and the lower reaction zone 121 or 221. In one or more embodiments, spent catalyst may comprise coke on the catalyst. The coke may reduce the activity of the catalyst, and spent catalyst may have reduced activity when compared to regenerated or fresh catalyst. In one or more embodiments, the dense fluidized bed of the lower reaction zone 121 or 221 may comprise spent catalyst. Without wishing to be bound by theory, the more reactive components of the hydrocarbon feed stream may crack in the lower reaction zone because high catalytic activity is not required for those components to react. As the hydrocarbon feed passes from the lower reaction zone 121 or 221 to the upper reaction zone 111, the hydrocarbon feed will encounter more active, fresh or regenerated catalyst, and the less reactive components of the hydrocarbon feed will crack. Thus, the counter-current flow of the catalyst and the hydrocarbon feed stream 101 may result in increased conversion of hydrocarbon feed to light olefins.

In one or more embodiments, the reactor 100 may comprise a steam stripping portion 130 below the lower reactor portion 120 or 220. The steam stripping portion 130 may define a steam stripping zone 131. The steam stripping portion 130 may be in fluid communication with and adjacent to the lower reactor portion 120 or 220. In one or more embodiments, spent catalyst may pass from the lower reaction zone 121 or 221 to the steam stripping zone 131. In further embodiments, the spent catalyst may pass directly from the lower reaction zone 121 to the steam stripping zone 131, whereby the lower reaction zone 121 or 221, and the steam stripping zone 131, are in direct fluid communication with each other. Steam may be passed to the steam stripping zone 131 by stream 105 in the steam stripping zone 131, steam may contact the spent catalyst and strip at least a portion of hydrocarbons from the spent catalyst. After contacting the steam in the steam stripping zone 131, spent catalyst may be passed in stream 104 from the reactor 100 through the catalyst outlet. In embodiments in which a co-feed is used and comprises steam, that co-feed with the hydrocarbon feed stream is in addition to the steam introduced to the steam stripping zone 131 by stream 105.

In one or more embodiments, the spent catalyst may be passed to a catalyst regenerator 150 where the spent catalyst is regenerated to form a regenerated catalyst. The catalyst regenerator 150 may comprise a riser 160 and a regenerator vessel 170. The spent catalyst may enter the riser 160 through a catalyst inlet. In one or more embodiments, the riser 160 is in fluid communication with the steam stripping zone 131 of the reactor 100 and the spent catalyst may be passed directly from the steam stripping zone 131 to the riser 160. In one or more embodiments, an air stream 151 is passed to the riser 160, and the air and spent catalyst travel up riser 160. In one or more embodiments, the air stream 151 is used to oxidize at least a portion of the coke on the spent catalyst, restoring activity to the spent catalyst and forming a regenerated catalyst.

The regenerated catalyst and air may move from riser 160 to regenerator vessel 170. In one or more embodiments, the riser 160 and regenerator vessel 170 are adjacent to each other and the regenerated catalyst and air move directly from the riser 160 to the regenerator vessel 170, wherein the riser 160 and regenerator vessel 170 are in direct fluid communication. In one or more embodiments, an air stream 152 may exit the regenerator vessel 170. Additionally, regenerated catalyst may exit the regenerator vessel 170 through a regenerated catalyst outlet. In one or more embodiments, the regenerated catalyst may be included in the catalyst of stream 103. In one or more embodiments, the regenerator vessel 170 and the upper reactor portion 110 may be in fluid communication with each other and regenerated catalyst may be passed directly from the regenerator vessel 170 of the regenerator 150 to the upper reaction zone 11 of the reactor 100 through catalyst inlet 113, wherein the regenerator vessel 170 and the upper reaction zone 111 are in direct fluid communication. In one or more embodiments, fresh catalyst may be added to catalyst in stream 103. In such embodiments, the catalyst may comprise both regenerated catalyst and fresh catalyst

EXAMPLES

The following examples illustrate one or more additional features of the present disclosure. In the following examples, a hydrocarbon feed stream was cracked to light olefins in the presence of catalyst samples that contained mixtures of spent catalyst and fresh catalyst to simulate a reactor having a lower fluidized bed and an upper counter-current plug flow reaction zone as described in this disclosure.

Catalysts Preparation (Preparation of phosphorous-modified ZSM-S zeolite): A modification precursor (phosphoric acid, $H_3PO_4$) was dissolved in deionized water matching P:Al=0.4 mole ratio. The resulting solution was stirred at 60° C. for 10 minutes, then ZSM-5 (SAR 23) was added to the solution and the stirring is maintained at 60° C. for an additional 5 hours. After, the dispersion dried in an oven at 100° C. for 12 hours, and then calcined at 650° C. for 3 hours.

Catalysts Preparation (Formulated cataysts preparation): The zeolitic component(s) were added to homogeneous liquid slurry of kaolin clay and distilled water and mechanically mixed until homogeneity. Table 1 shows the specific formulations for the different catalyst particles formed, with all quantities in weight percent relative to the formed catalyst particles. The zeolite(s) used were $NH_4^-$ ZSM-5 having a SAR of 23 on a molar basis; P-modified ZSM-5 with P/Al molar ratio of 0.4, and/or $H^+$ USY having a SAR of 30 on a molar basis After of the mixture of clay and zeolitic component(s) the binder component, a solution of $Al_2Cl(OH)_5$, is added to the slurry and stirred. A ball milling procedure with zirconium oxide beads at 300 RPM was performed. In the embodiments of catalysts S-7, S-8, S-9 and S-10, powdered SiC (given diameter of 800 nm) was combined with the slurry containing all components prior to ball milling. The slurred formulation was spray dried at an inlet temperature of 220° C. The final catalysts were calcined at 700° C. for 7 hours prior to being characterized and tested in catalytic reactions. Formulated catalysts are denoted as listed in Table 1.

Figure 5A:
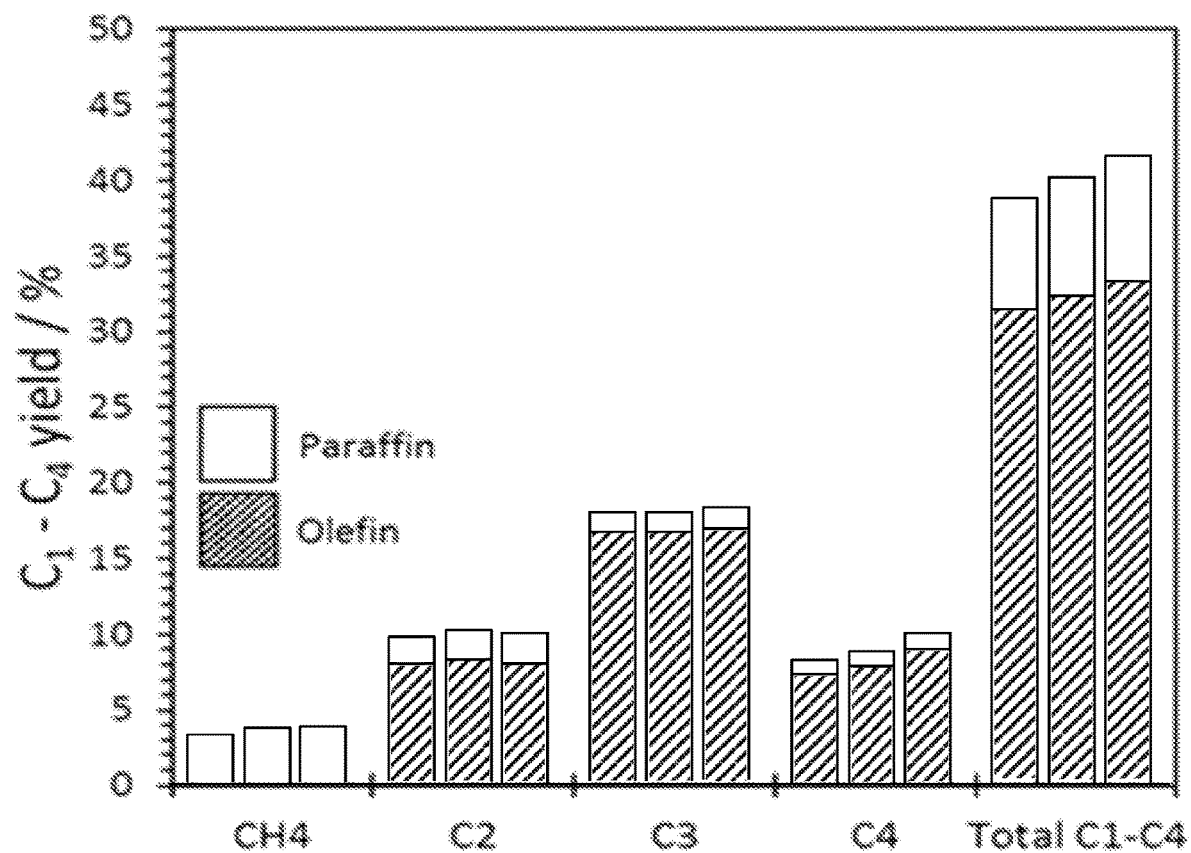
FIGS. 5A-5C are plots of the C1-C4 yields of overall activity and product distribution using catalysts of examples herein.
Figure 5B:
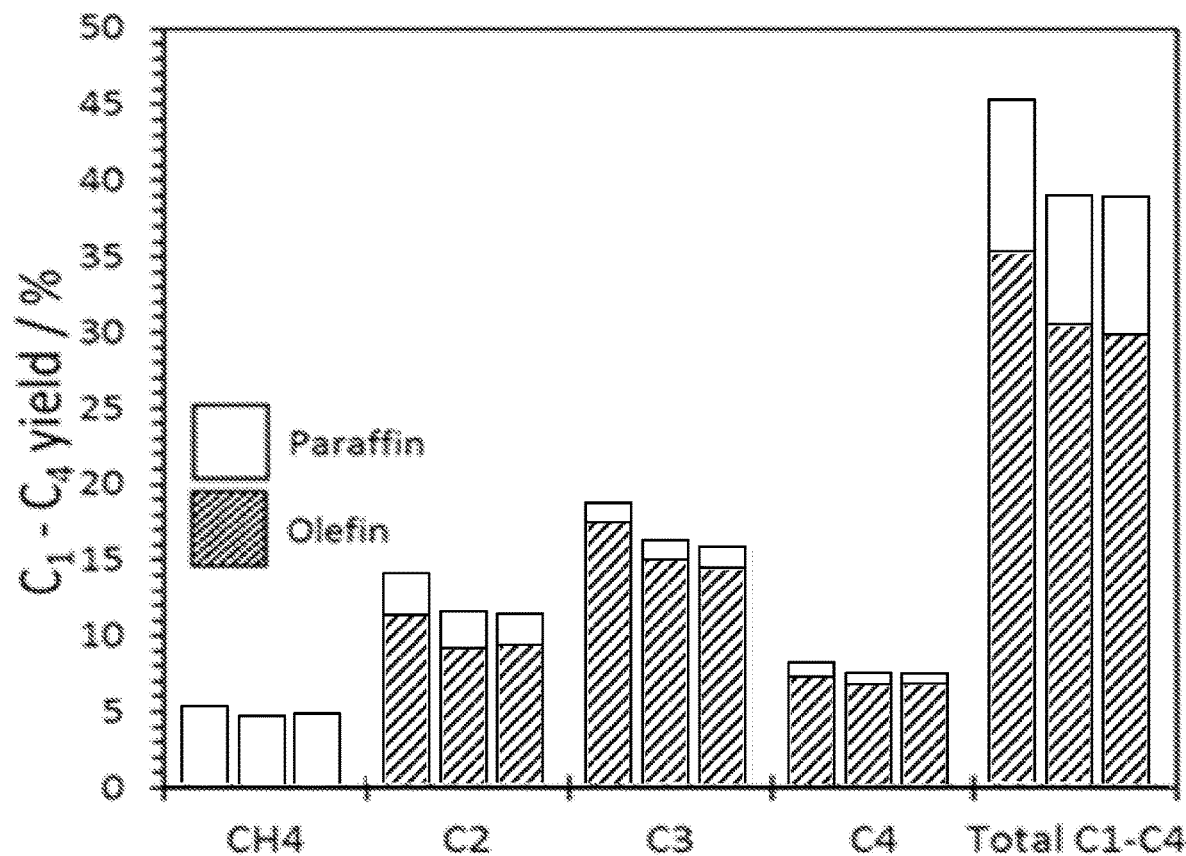
Figure 5C:
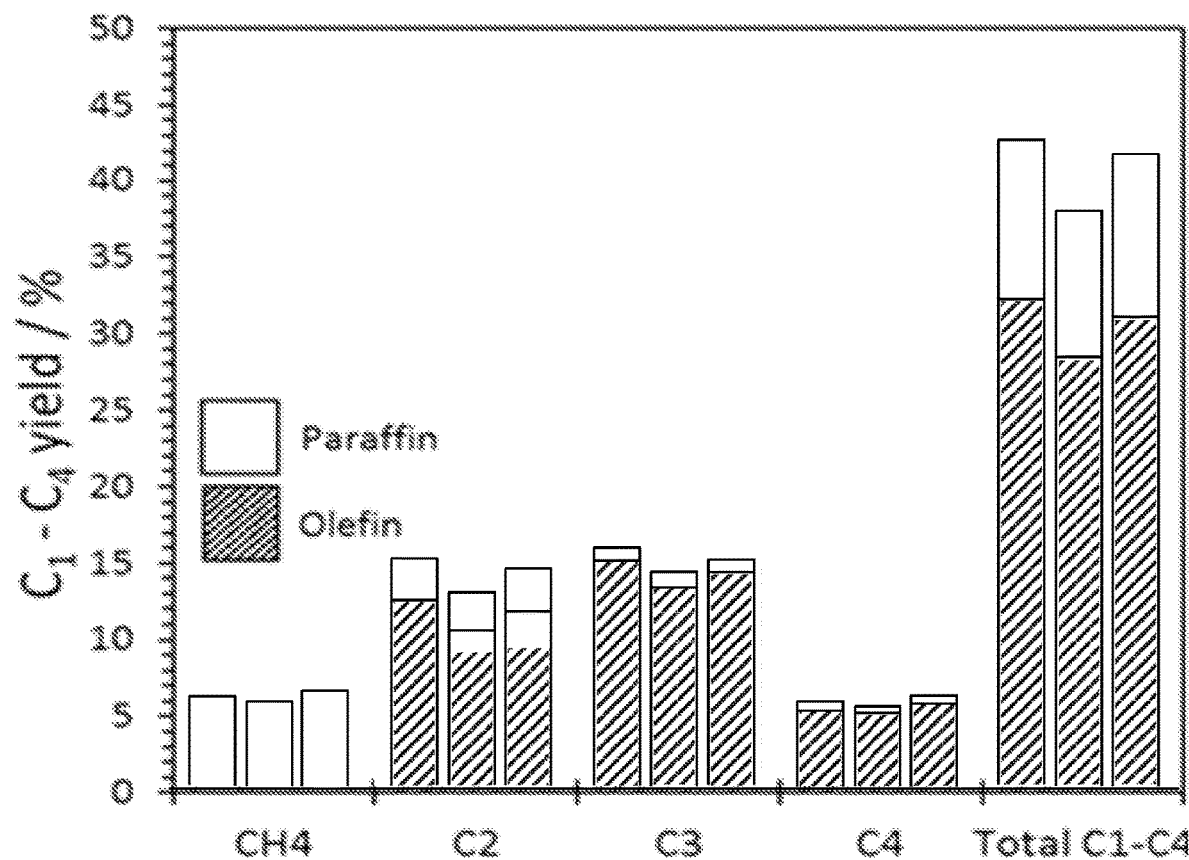

Catalyst Application—Example 1: The catalyst particles S-8 and S-10 were mixed at S-8:S-10 mass ratios of 0.7:0.3, 0.6:0.4. The mixed catalysts were tested in a laboratory scale dense fluidized bed reactor unit, designed to mimic some aspects of the MZFBR disclosed herein with 4 grams of catalyst loading for reaction of a hydrocarbon feed of Arabian Light crude oil. The reaction temperature was varied at 625, 650 and 675° C. to ascertain the effect of temperature. The flowrates were: water, 0.1 mL/min; hydrocarbon feed, 0.1 mL/min; $N_2$, 100 mL/min. The time on stream (TOS) was 80 minutes. Prior to catalytic testing, all catalysts were hydrothermally treated at 810° C. for 5 hours under 90% of steam. FIGS. 5A, 5B and 5C plot the C1-C4 yields of overall activity and product distribution in the catalytic cracking of Arabian Light crude oil at different temperatures (FIG. 5A, 625° C., FIG. 5B, 650° C. and FIG. 5C, 675° C.) using different physical mixtures of S-8:S-10 catalyst particles: 0.5:0.5 (left vertical bar), 0.6 and 0.4 (center vertical bar), 0.7 and 0.3 (right vertical bar).

Figure 6:
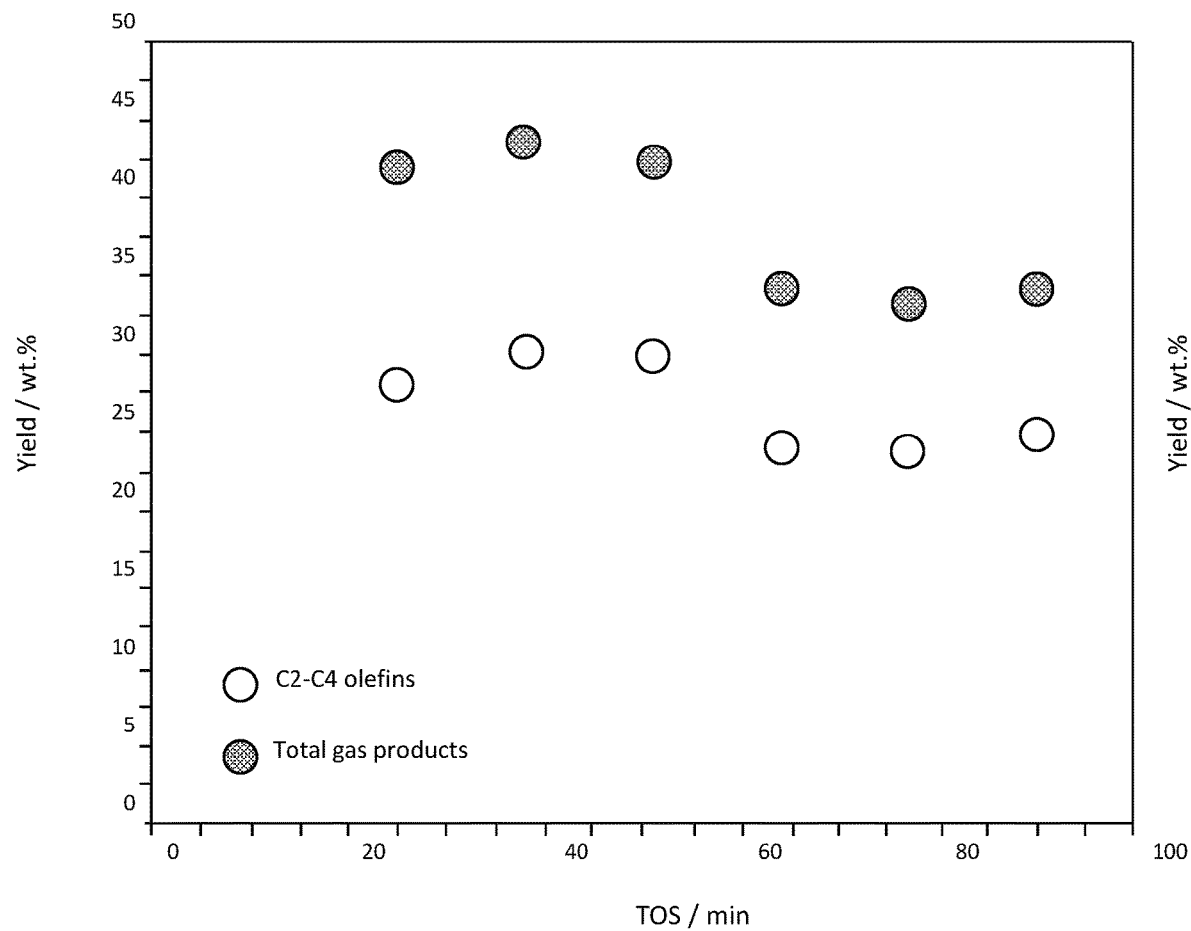
FIG. 6 plots the yield as a function of time on stream using a catalyst of an example herein.

Catalyst Application—Example 2: The catalyst particles S-5 were tested in a laboratory scale dense fluidized bed reactor unit, designed to mimic some aspects of the MZFBR disclosed herein for reaction of a hydrocarbon feed of Arabian Light crude oil. The reaction temperature was 570° C. The flowrates were: water, 0.1 mL/min; hydrocarbon feed, 0.1 mL/min; $N_2$, 100 mL/min. Prior to catalytic testing, the catalyst was hydrothermally treated at 810° C. for 5 hours under 90% of steam. FIG. 6 plots the yield as a function of time on stream.

For the purpose of describing the simplified schematic illustrations and descriptions of the figures, the numerous valves, temperature sensors, electronic controllers and the like that may be employed and well known to those of ordinary skill in the art of certain processing operations are not included. Further, accompanying components that are often included in typical chemical processing operations, such as air supplies, catalyst hoppers, flue gas handling systems, dryers, heaters, heat exchangers, pipes, pumps, compressors, and controllers, are not depicted. Further, while not shown, light gases such as $C_1$ and $C_2$ gases from one or more zones can be used a fuel for one or more heaters within the system as is known. Accompanying components that are in cracking units, such as bleed streams, spent catalyst discharge subsystems, and catalyst replacement sub-systems are also not shown. It should be understood that these components are within the spirit and scope of the present embodiments disclosed. It should be understood that the reactor diameter and length or relative diameter and length with respect to the zone should not be inferred from the drawings and that the diameter of the reactor may be similar or different to the depiction in the drawings. Additionally, operational components, such as those described in the present disclosure, may be added to the embodiments described in this disclosure.

It is to be understood that like numerals in the drawings represent like elements through the several figures, and that not all components and/or steps described and illustrated with reference to the figures are required for all embodiments or arrangements. Further, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "including," "comprising," or "having," "containing," "involving," and variations thereof herein, when used in this specification, specify the presence of stated features, integers, steps, operations, elements, and/or components, but do not preclude the presence or addition of one or more other features, integers, steps, operations, elements, components, and/or groups thereof. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

Unless otherwise defined, all technical and scientific terms used herein have the same meaning as commonly understood by one of ordinary skill in the art to which this invention belongs. In case of conflict, the present specification, including definitions, will control. Although methods and materials similar or equivalent to those described herein can be used in the practice or testing of embodiments of the present invention, suitable methods and materials are described below. In addition, the materials, methods, and examples are illustrative only and not intended to be limiting.

When an amount, concentration, or other value or parameter is given as either a range, preferred range or a list of upper preferable values and/or lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range.

It should be noted that use of ordinal terms such as "first," "second," "third." etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Notably, the figures and examples above are not meant to limit the scope of the present disclosure to a single implementation, as other implementations are possible by way of interchange of some or all the described or illustrated elements. Moreover, where certain elements of the present disclosure can be partially or fully implemented using known components, only those portions of such known components that are necessary for an understanding of the present disclosure are described, and detailed descriptions of other portions of such known components are omitted so as not to obscure the disclosure. In the present specification, an implementation showing a singular component should not necessarily be limited to other implementations including a plurality of the same component, and vice-versa, unless explicitly stated otherwise herein. Moreover, applicants do not intend for any term in the specification or claims to be ascribed an uncommon or special meaning unless explicitly set forth as such. Further, the present disclosure encompasses present and future known equivalents to the known components referred to herein by way of illustration.

The foregoing description of the specific implementations will so fully reveal the general nature of the disclosure that others can, by applying knowledge within the skill of the relevant art(s), readily modify and/or adapt for various applications such specific implementations, without undue experimentation, without departing from the general concept of the present disclosure. Such adaptations and modifications are therefore intended to be within the meaning and range of equivalents of the disclosed implementations, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s). It is to be understood that dimensions discussed or shown are drawings accordingly to one example and other dimensions can be used without departing from the disclosure.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations

TABLE 1

| Code | Kaolin clay | Zeolites | | Binder | SiC |
| | | ZSM-5 | FAU | | |
| --- | --- | --- | --- | --- | --- |
| S-1 | 70 | 10 | — | 20 | — |
| S-2 | 60 | 20 | | | |
| S-3 | 50 | 30 | | | |
| S-4 | 50 | 20 | 10 | 20 | |
| S-5 | 45 | 20 | 20 | 15 | |
| S-6 | 37.5 | 20 | 30 | 12.5 | |
| S-7 | 20 | 40 | — | 20 | 20 |
| S-8 | 20 | — | 40 | 20 | 20 |
| S-9 | 20 | 20 | 20 | 20 | 20 |
| S-10 | 20 | 40* | — | 20 | 20 |

*$H_3PO_4$ modified (P/Al = 0.4)

The invention claimed is:

1. A method for processing hydrocarbons to produce light olefins, the method comprising:
   passing a hydrocarbon feed stream into a feed inlet of a reactor for contacting with catalyst particles, wherein the reactor comprises:
      an upper reactor portion defining an upper reaction zone, the upper reactor portion comprising a catalyst inlet and a hydrocarbon product outlet, wherein the catalyst inlet and the hydrocarbon product outlet are positioned at or near the top of the upper reactor portion; and
      a lower reactor portion defining a lower reaction zone, the lower reactor portion comprising a feed inlet and a catalyst outlet, wherein feed inlet and the catalyst outlet are positioned at or near the bottom of the lower reactor portion, and wherein the lower reaction zone is in fluid communication with and adjacent to the upper reaction zone; and
         wherein the catalyst particles have a downward superficial velocity through the upper reactor portion and the lower reactor portion and the hydrocarbon feed stream has an upward superficial velocity through the upper reactor portion and lower reactor portion such that the hydrocarbon feed stream and the catalyst particles move with a counter-current orientation;
         wherein the upper reaction zone operates with a counter-current plug flow regime;
         wherein the lower reaction zone operates with a dense bed fluidization regime;
         wherein contacting the catalyst particles with the hydrocarbon feed stream cracks one or more components of the hydrocarbon feed stream and forms a hydrocarbon product stream;
         wherein the hydrocarbon product stream comprises light olefins and other reaction products;
   and
   passing the hydrocarbon product stream out of the upper reaction zone through the hydrocarbon product outlet;
   wherein the catalyst particles comprise:
      (a) a mixture that is a physically mixed combination of separate particles of at least first composite particles and second composite particles,
      the first composite particles comprising about 5-70 wt. % of a 10-member ring zeolite component optionally modified with phosphorous, about 5-70 wt. % of a first binder component, about 10-60 wt. % of a first filler component; and 0-40 wt. % of an optional first additive component, and
      the second composite particles comprising about 5-wt. % of a 12-member ring zeolite component, about 5-70 wt. % of a second binder component, about 10-60 wt. % of a second filler component; and about 0-40 wt. % of an optional second additive component;
   wherein
      the first and second binder component are the same or different amorphous components selected from the group consisting of alumina, silica, alumina-silicate, silica-aluminate, alumina phosphate and combinations comprising two or more of said amorphous binder components,
      the first and second filler component are the same or different components selected from the group consisting of kaolin, sepiolite, talc, attapulgite, montmorillonite and two or more of said filler components; and
      the first and second additive component are the same or different components selected from the group consisting of metal carbides, rare earth metals, alkali metals, alkaline earth metals, and metal oxides;
   or
      (b) multi-zeolite composite particles comprising about 5-75 wt. % of a 10-member ring zeolite component modified with phosphorous, about 5-75 wt. % of a 12-member ring zeolite component, about 5-70 wt. % of a binder component, about 10-60 wt. % of a filler component; and about 0-40 wt. % of an optional additive component;
   wherein
      the binder component is an amorphous component selected from the group consisting of alumina, silica, alumina-silicate, silica-aluminate, alumina phosphate and combinations comprising two or more of said amorphous binder components;
      the filler component is selected from the group consisting of kaolin, sepiolite, talc, attapulgite, montmorillonite and two or more of said filler components; and the additive component is selected from the group consisting of metal carbides, rare earth metals, alkali metals, alkaline earth metals, and metal oxides.

2. The method as in claim 1, wherein the 10-member ring zeolite component is characterized by a micropore diameters in the range of about 0.45-0.6 nanometers.

3. The method as in claim 2, wherein the 10-member ring zeolite comprises a pentasil (MFI) framework.

4. The method as in claim 3, wherein the zeolite having pentasil (MFI) framework comprises Zeolite Socony Mobil-5 (ZSM-5), or ZSM-5 modified via mesoporization.

5. The method as in claim 4, wherein the zeolite having pentasil (MF) framework comprises ZSM-5 modified via mesoporization, wherein mesoporization is selected from the group consisting of desilication, dealumination and steaming.

6. The method as in claim 3, wherein zeolite having pentasil (MFI) framework comprise phosphorus-modified pentasil (MFI) framework zeolite with phosphorous at a P/Al molar ratio in the range of about 0.1-1.

7. The method as in claim 2, wherein 10-member ring zeolite comprises a ferrierite (FER) zeolite.

8. The method as in claim 1, wherein the 12-member ring zeolite component is characterized by micropore diameters in the range of about 0.6-0.8 nanometers.

9. The method as in claim 8, wherein the 12-member ring zeolite comprises a faujasite (FAU) framework.

10. The method as in claim 9, wherein the zeolite having a faujasite (FAU) framework is selected from the group consisting of ultrastable Y (USY) zeolite, zeolite Y and zeolite X.

11. The method as in claim 8, wherein the 12-member ring zeolite comprises a mordenite (MOR) framework.

12. The method as in claim 8, wherein the 12-member ring zeolite comprises a beta (*BEA) framework.

13. The method as in claim 1, wherein the 10-member ring zeolite comprises Zeolite Socony Mobil-5 (ZSM-5) that is modified with phosphorous at a P/Al molar ratio in the range of about 0.1-1, and wherein the 12-member ring zeolite comprises ultrastable Y (USY) zeolite.

14. The method as in claim 13, wherein the catalyst particles comprise mixture of at least the first composite particles and the second composite particles, wherein the first composite particles comprise about 20-75 wt. % of a total catalyst particle mass and wherein the second composite particles comprises about 20-75 wt. % of the total catalyst particle mass.

15. The method as in claim 13, wherein the catalyst particles comprise multi-zeolite catalyst particles comprising about 15-75 wt. % of the 10-member ring zeolite and about 20-75 wt. % of the 12-member ring zeolite.

16. The method as in claim 1, wherein about 5-40 wt. % of the additive component is provided.

17. The method as in claim 16, wherein the additive component comprises silicon carbide particles having a given diameter in the range of 1-1000 nanometers and in an amount of about 15-25 wt. % of the (a) first composite particles and second composite particles or 15-25 wt. % of the (b) the multi-zeolite composite particles, and wherein silicon carbide enables
  for (a) the first composite particles and the second composite particles, increase of densities, and
  for (a) first composite particles and second composite particles or (b) the multi-zeolite composite particles, an improvement of the thermal conductivity across the catalyst body compared to composites in the absence of an additive component.

18. The method as in claim 1, wherein the catalyst particles have a tap density in the range of about 0.55-1.3 grams per milliliter.

19. The method as in claim 1, further comprising:
  passing the catalyst through the catalyst outlet to a catalyst regenerator, wherein the catalyst passing through the catalyst outlet is spent catalyst;
  regenerating at least a portion of the spent catalyst to form a regenerated catalyst; and
  passing the regenerated catalyst to the upper reaction zone through the catalyst inlet.

20. The method as in claim 1, further comprising passing the catalyst through a steam stripping portion of the reactor prior to the catalyst outlet.

21. The method as in claim 1, wherein the light olefins comprise one or more of ethylene, propylene, or butene, and wherein the other reaction products comprise one or more of dry gas, LPG, aromatics, light naphtha, full range naphtha, heavy naphtha, light cycle oil, or heavy cycle oil.

22. The method as in claim 1, wherein one or both of the first or second binder component of the separate particles of at least first composite particles and second composite particles, or the binder component of the multi-zeolite composite particles, comprises γ alumina.

23. The method as in claim 1, wherein one or both of the first or second additive component of the separate particles of at least first composite particles and second composite particles, or the additive component of the multi-zeolite composite particles, is selected from the group consisting of silicon carbide, cerium, lanthanum, sodium, ferric oxide and cupric oxide.

24. The method as in claim 13, wherein the catalyst particles comprise mixture of at least the first composite particles and the second composite particles, wherein the first composite particles comprise about 30-75 wt. % of a total catalyst particle mass and wherein the second composite particles comprises about 25-50 wt. % of the total catalyst particle mass.

* * * * *